Oct. 28, 1952

M. A. CARTER 2,615,993

ELECTRONICALLY OPERATED ADVERTISING
AND SOUND REPRODUCING APPARATUS

Filed Sept. 26, 1950

INVENTOR.
MELVIN A. CARTER
BY
[signature]
ATTORNEY

INVENTOR.
MELVIN A. CARTER
BY
ATTORNEY

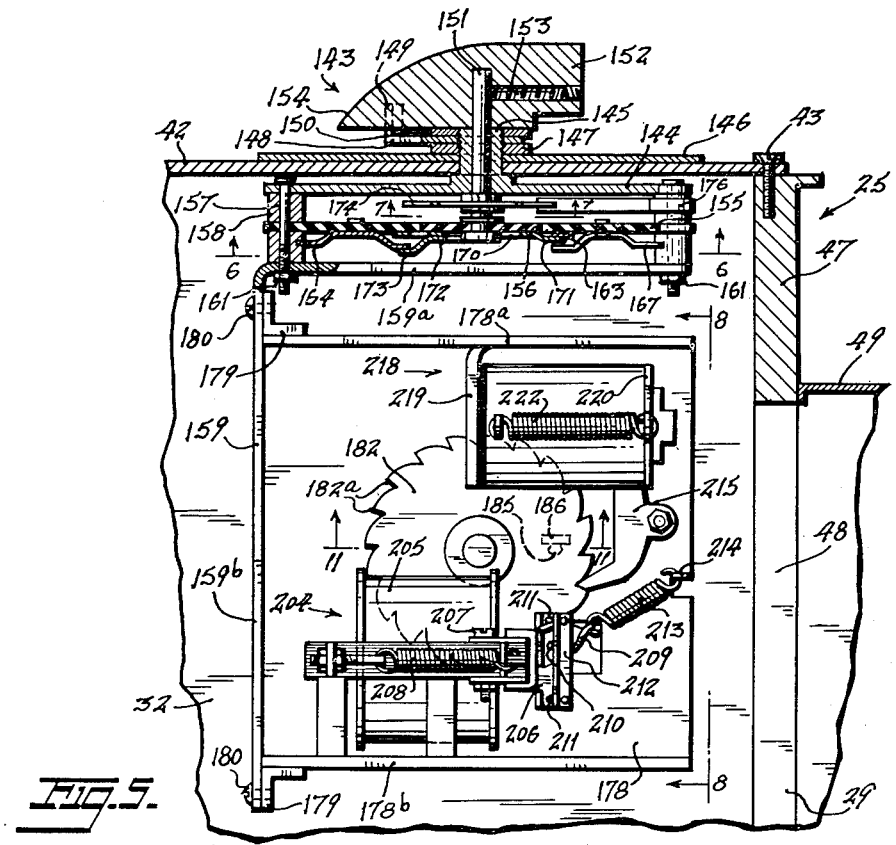
Fig. 5.
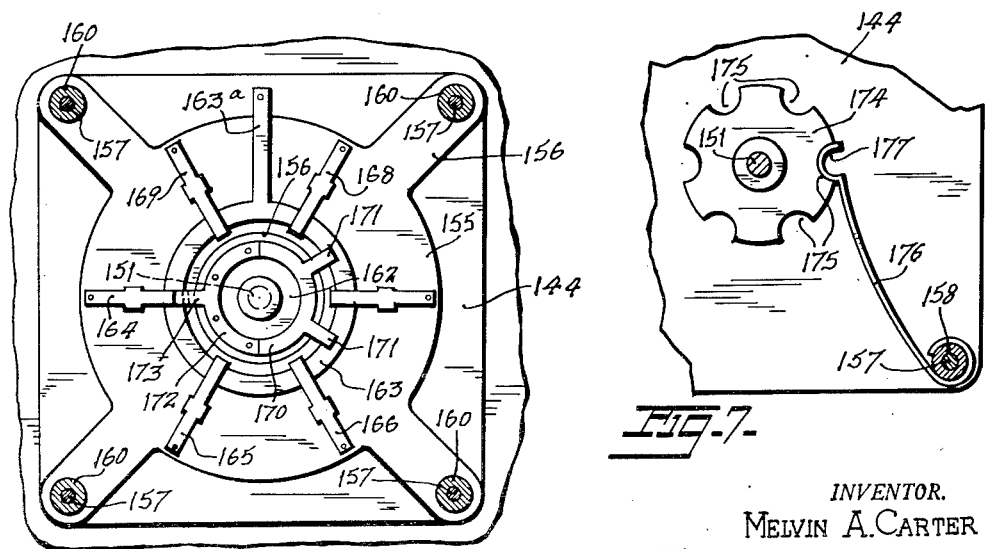
Fig. 6.
Fig. 7.
INVENTOR.
MELVIN A. CARTER
BY
ATTORNEY

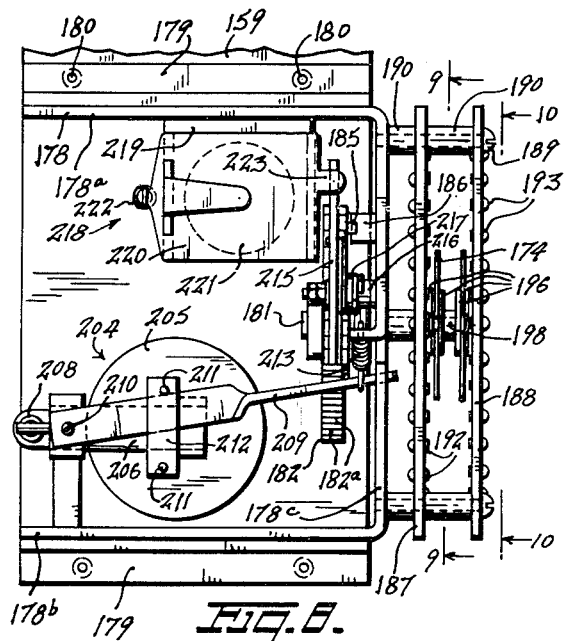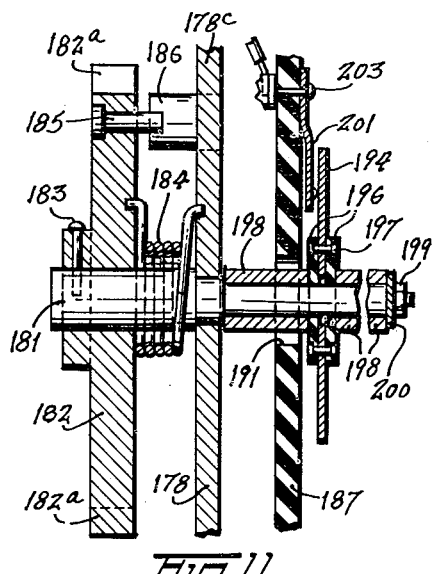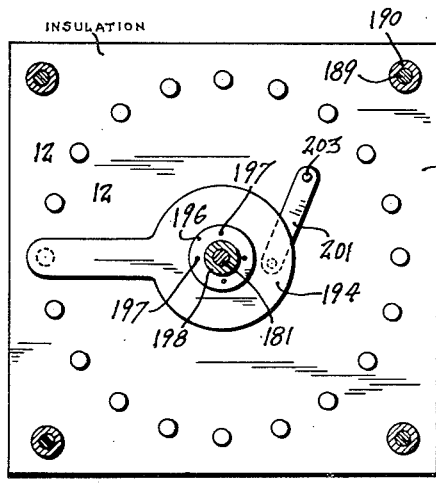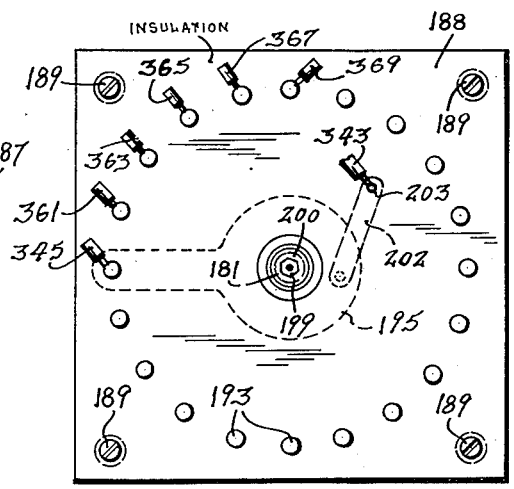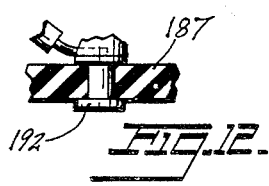

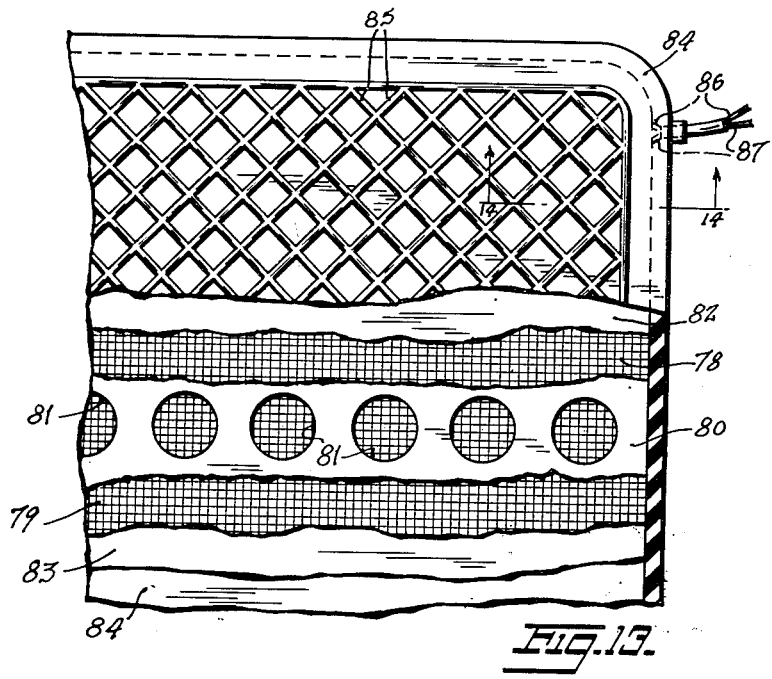
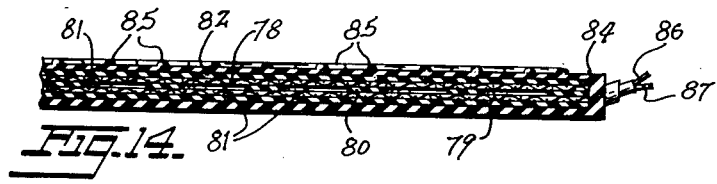
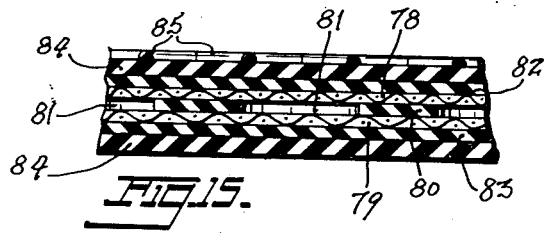

INVENTOR.
MELVIN A. CARTER

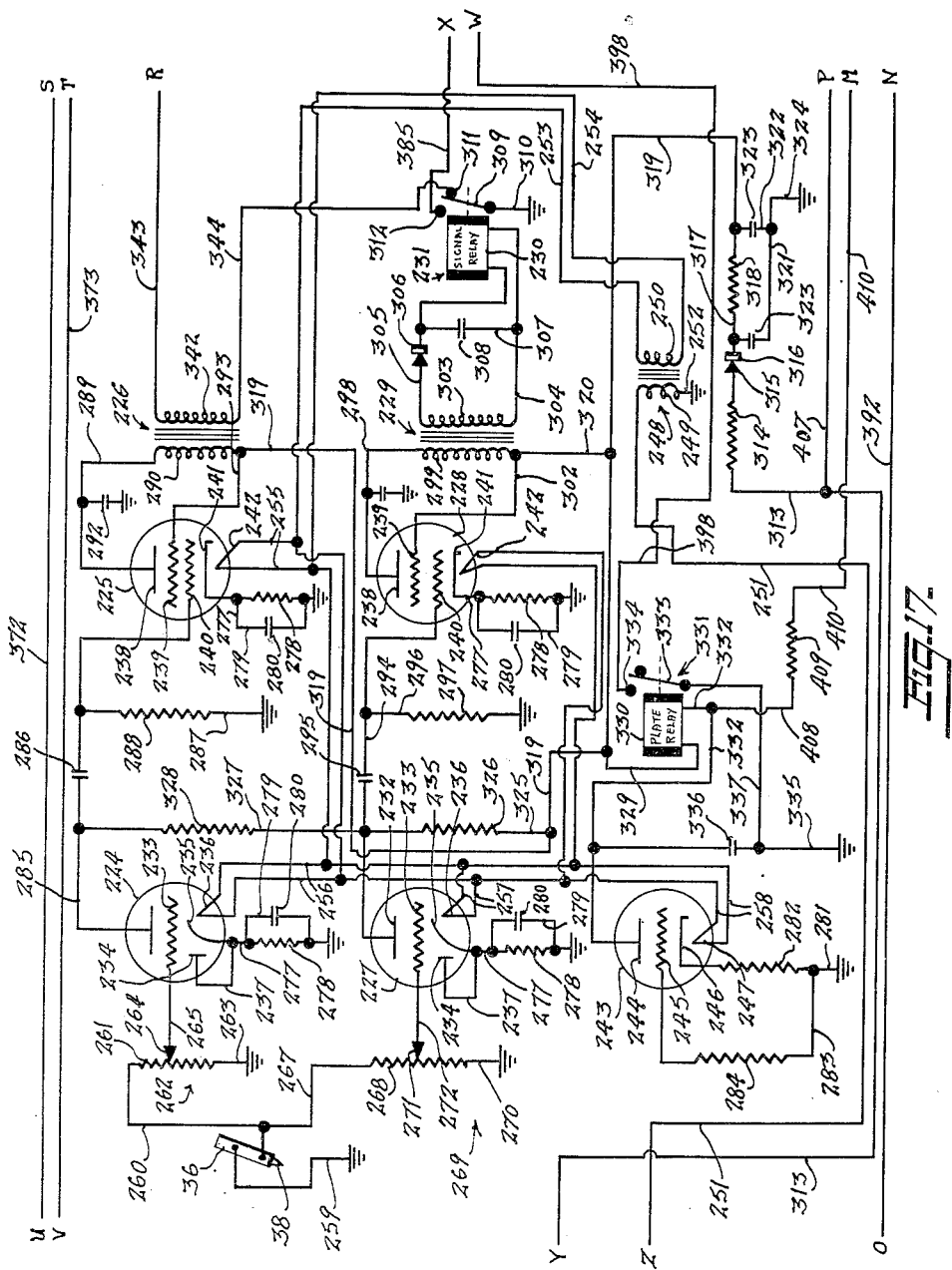

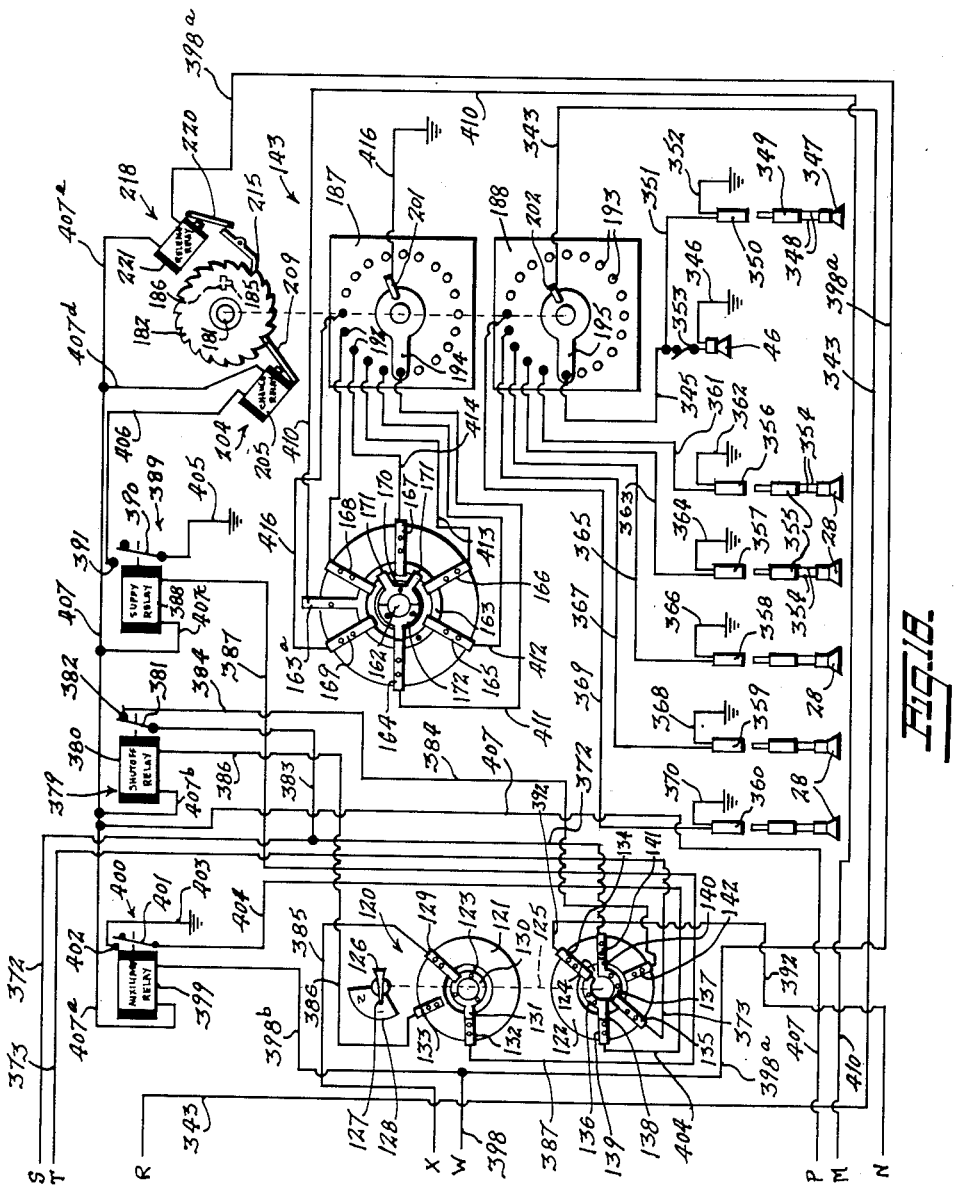

Patented Oct. 28, 1952

2,615,993

UNITED STATES PATENT OFFICE 2,615,993

ELECTRONICALLY OPERATED ADVERTISING AND SOUND REPRODUCING APPARATUS

Melvin A. Carter, Brooklyn, N. Y.

Application September 26, 1950, Serial No. 186,859

10 Claims. (Cl. 179—100.4)

This invention relates to new and useful improvements in a sound reproducing apparatus for transcribing messages from a record on which the messages are recorded and separated from each other by a signal recorded above the frequency of the messages. While the present application of the invention is designed primarily for use with disc records, it is appreciated that the teachings of the present invention are equally well adapted for transcribing messages recorded on cylindrical records or on elongated tapes or wires or the like without departing from the scope of the present invention.

More particularly, the present invention proposes the construction of a novel sound reproducing apparatus which will find many different uses in business, industry, education and other fields, but which is particularly well adapted to sales promotion work or for use in audio-visual education programs. The present illustration shows the device as adapted for use in sales promotion work, but such illustration is merely indicative of one of the many possible adaptations of the present invention.

Still further, the present invention proposes characterizing the reproducing apparatus by an amplifier circuit influenced by a transcribing arm having a needle engaging the groove of the record so as to successively play the recorded messages through different speakers or to play the messages one after another through only a main speaker, as desired.

A further object of the present invention is to construct the apparatus to be automatic in its operation to play the messages in either of the two ways set forth in the preceding paragraph in accordance with manual settings of a two-position changeover switch.

Another object of the present invention proposes constructing the amplifier circuit to include a signal relay to be influenced by the signals recorded on the record in a manner to operate a control circuit to vary the speaker through which the next successive message will be played in the one position of the changeover switch or to energize a normally open shut-off relay to break the amplifier circuit in the other position of the changeover switch.

A still further object of the present invention proposes connecting a stepping switch in series with the speakers and the said one position of the changeover switch to be operated by a change relay which is energized by said signal relay through a supply relay in a manner to cause the stepping switch to be advanced one position each time the signal relay is energized by a signal from the record.

The present invention further proposes a master relay for controlling energization of the amplifier circuit and to arrange the master relay in a circuit which includes a source of electrical energy in such a manner that when the master relay is once energized it will retain itself energized energizing the amplifier circuit until such time as the master relay circuit is broken by energization of the reject solenoid in the one position of the changeover switch or by energization of the shut-off relay in the other position of the changeover switch.

Still another object of the present invention proposes constructing the reproducing apparatus so that the reject solenoid, which is connected to the reject arm of the record player, will be energized by a second stepping switch connected to move in unison with said first stepping switch in a manner so that both of said stepping switches are moved by the change relay causing the reject arm to move the transcribing arm back to its starting position on the record.

A further object of the present invention proposes connecting a normally closed switch in the circuit with the master relay and arranged to be opened by the reject arm when the reject solenoid is energized in a manner to break the circuit through the master relay in the one position of the changeover switch.

The present invention still further proposes to arrange a manually operable selector switch for varying the number of messages that will be played through successive speakers and when the reject solenoid will be energized in the one position of the changeover switch.

Another object of the present invention proposes providing the reproducing apparatus, particularly when adapted to sales promotion work, with a sign connected in the circuit in such a manner that the sign will be caused to periodically blink in the inoperative position of the amplifier and caused to be continuously illuminated when the amplifier is in operation.

A still further object of the present invention proposes a reduced voltage circuit controlled by a foot pad or an auxiliary hand operative switch for controlling initial operation of said master relay in a manner to energize the amplifier circuit and thereafter maintain itself energized until later deenergization occurs in accordance with either of the two methods previously outlined.

A further object of the present invention proposes main input line for supplying current to the reduced voltage circuit and the amplified circuit and controlled by a manually operable master switch in a manner so that the entire apparatus can be shut off by opening that master switch.

Still another object of the present invention proposes the provision of a filament transformer having its secondary connected in parallel with the heaters of the tubes of the amplifier circuit and its primary connected in series with the input line so that when the master switch is closed the heaters will be enrgized so that the amplifier circuit will be ready for instant operation when the master relay energizing the remainder of the amplifier circuit is closed.

The invention further proposes the provision of a turntable upon which the record is to be placed and a motor for turning that turntable and connected in the amplifier circuit in such a manner that the turntable will be instantly energized when the master relay is energized.

It is a further object of the present invention to construct a sound reproducing apparatus for carrying out the foregoing objects which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 5 is a greatly enlarged partial vertical sectional view of the control box taken through the center of the selector switch substantially on the line 5—5 of Fig. 3.

Fig. 6 is a horizontal sectional view taken on the line 6—6 of Fig. 5.

Fig. 7 is a partial horizontal sectional view taken on the line 7—7 of Fig. 5.

Fig. 8 is a partial vertical view taken on the line 8—8 of Fig. 5.

Fig. 9 is a vertical sectional view taken on the line 9—9 of Fig. 8.

Fig. 10 is a partial elevational view looking in the direction of the line 10—10 of Fig. 8.

Fig. 11 is an enlarged partial horizontal sectional view taken on the line 11—11 of Fig. 5.

Fig. 12 is an enlarged sectional view through one of the contacts of the stepping switches taken on the line 12—12 of Fig. 9.

Fig. 13 is an enlarged partial plan view of the foot pad with portions thereof broken away to reveal interior constructions.

Fig. 14 is a partial vertical sectional view taken on the line 14—14 of Fig. 13.

Figs. 16 to 18 are portions of a schematic wiring diagram of the present invention. With the sheet having Fig. 16 laid flat, the sheet having Fig. 17 is positioned to the right of the sheet having Fig. 16 and the sheet having Fig. 18 is positioned to the right of the sheet having Fig. 17. In those positions of the sheets the reference letters along the vertical edges of the figures will match-up denoting continuations of the various electric leads as they pass between the several figures of the schematic wiring diagram.

The sound reproducing apparatus, according to the present invention, is comprised of the following main parts; a control box 25, an electric sign 26, a foot pad 27 and a group of auxiliary speakers 28. On Figs. 1 and 18, the group of auxiliary speakers 28 is shown as being comprised of five such speakers but it will be appreciated, as this specification proceeds, that showing is by way of illustration only and that their numbers can be increased or decreased in accordance with the number of individual messages recorded on the disc record to be hereinafter described.

Figure 1:
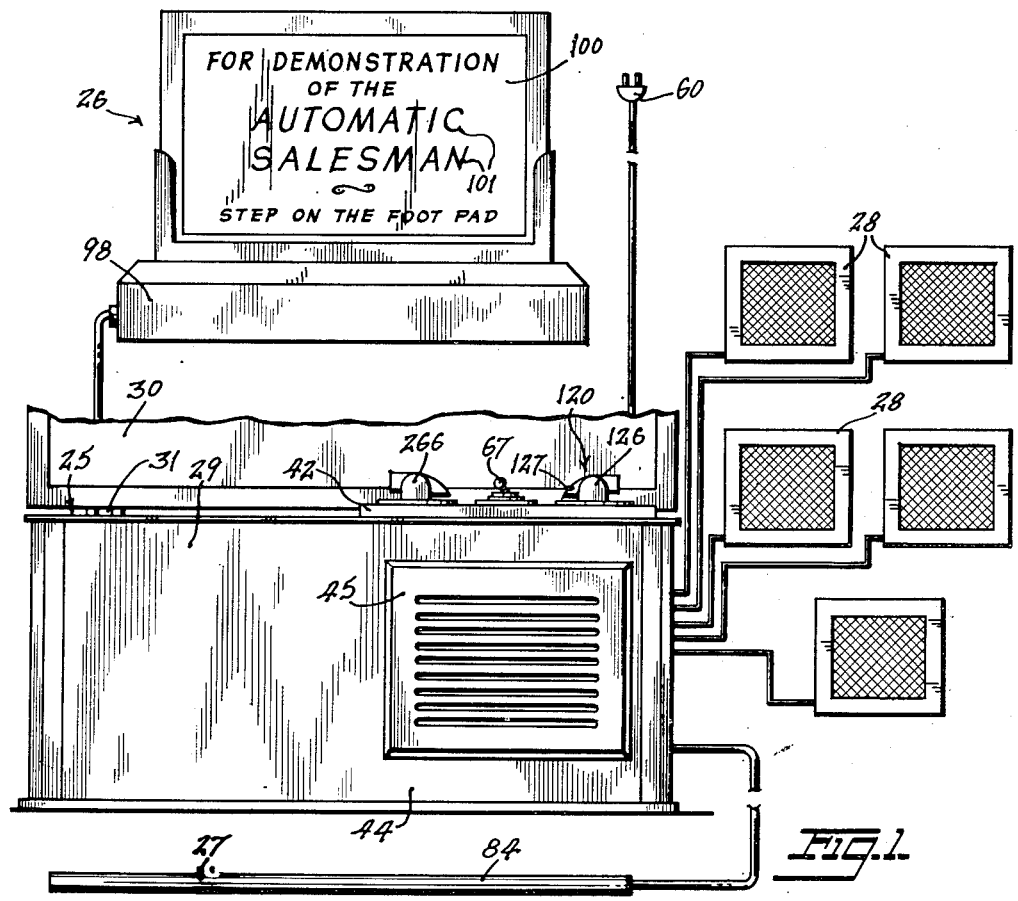
Fig. 1 is a diagrammatic view of the complete sound reproducing apparatus constructed in accordance with the present invention.

The control box 25 forms the heart of the present apparatus and encloses most of the parts shown in the schematic wiring diagram of Figs. 16 to 18 with the exception, of course, of those parts shown externally in Fig. 1. The control box 25 comprises a hollow box body 29 made of wood or other decorative electrical insulation material and has an open top closed by a hollow cover 30 made of the same material as the box body 29. The cover 30 is pivoted to the rear top edge of the box body 29 by several hinges 31, see Figs. 1, 2 and 4, so that the cover can be pivoted between open and closed positions.

Figure 3:
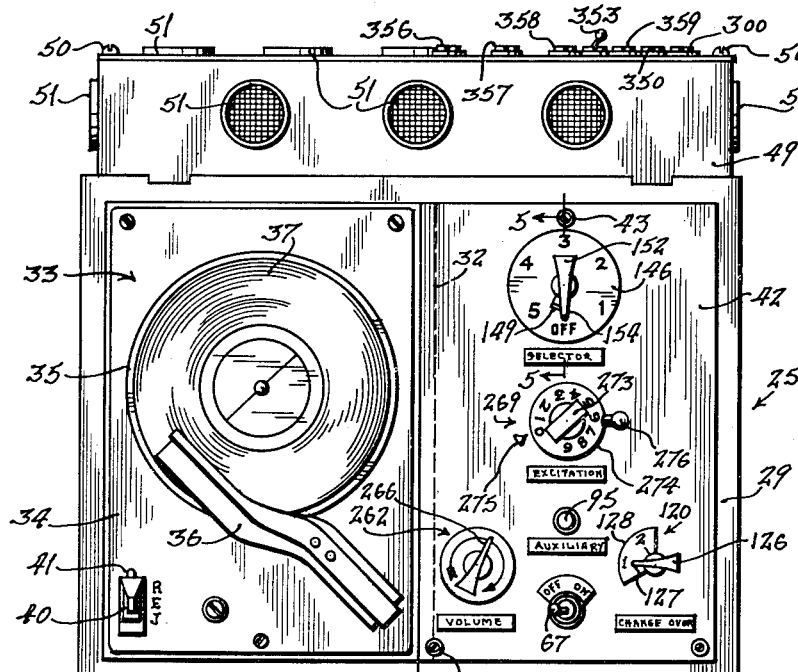
Fig. 3 is a plan view of the control box, but with the top cover completely removed.

The control box 25 has the interior of its body 29 divided into two adjacent halves by a vertical wall 32, see Fig. 3. The right half of the box body 29, as viewed in Fig. 3, encloses a conventionally constructed record player 33 including an intermediate wall 32 supported at an elevation below the open top of the box body 29. Supported to rotate slightly above the top face of the intermediate wall 34, there is a turntable 35 across which a pivotally mounted transcribing arm 36 is to move. Provided to be rested on the turntable 35, as is generally known in the art, is the usual disc record 37, see Fig. 3. The free end of the transcribing arm 36 carries the usual needle 38, see Fig. 17, for engaging the spiral groove of the record 27 to advance along that spiral groove as the record turns. Recorded on the surface of the record 37 there is a plurality of successive messages which are separated one from the other by a signal recorded at a frequency above the frequency at which the messages are recorded. The purpose for the signals will become clear as this specification proceeds, it being sufficient to explain at this time that the signals might be any desired sound, produced by shouting, whistling, clapping two sticks together or any similar sound, carefully recorded at the desired elevated frequency.

The record player 33 further includes the usual reject arm 39 located below the intermediate wall 34 and diagrammatically illustrated in Fig. 16. The reject arm 39 has a control button 40 extended upward through the wall 34 through an elongated slot 41, see Fig. 3, by which the reject arm 39 can be manually operated for returning the transcribing arm 36 to its starting position on the record 37, all as generally known in the art of automatic record players. Further constructional details of the record player 33 and its reject arm 39 will not be given in this specification as such details are generally known in the art and form no part of the present invention.

The turntable 35 and the recordings of the disc record 37 may be made to turn at 33, 45 or 78

R. P. M., as desired, but it has been found that the size of the control box 25 can be kept to a minimum and the number of messages recorded on the record kept at a maximum for the size of the control box, if the record player is one of the type which operates at 33 R. P. M.

Figure 4:
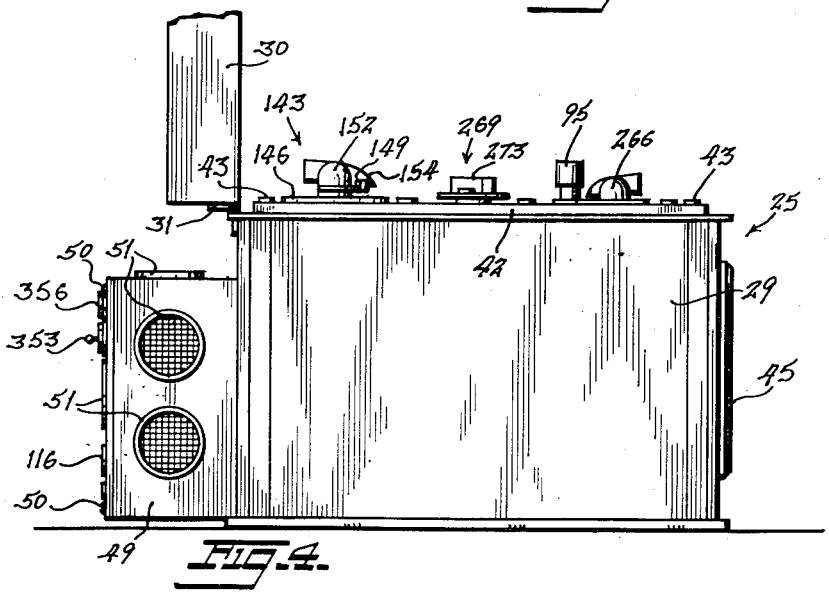
Fig. 4 is an end elevational view of the control box looking from the left-hand side of Fig. 1.

The left half of the box body 29 is closed by a wall 42 arranged at a level with the top of the box body, as shown in Figs. 1 and 4. The wall 42 is releasably retained in position by several screws 43 and has on the top face thereof the various control knobs and the like of the reproducing apparatus which will be hereinafter described. The vertical wall 32 extends only between the intermediate wall 34 and the wall 42 so that the lower portion of the interior of the box body 29 is unobstructed for the passage of electric wires between the halves of the box body.

The front wall 44 of the box body 29, below the wall 42, is formed with an opening closed by a grille 45, see Figs. 1 and 4, behind which there is mounted a main speaker 46 diagrammatically illustrated in Fig. 18. The rear wall 47 of the box body 29 extends only part way to the bottom of the box body forming a rear opening 48, see Fig. 5, which is closed by a metallic container 49 mounted in position on the outer face of the rear wall 47 over the rear opening 48. The container 49 is mounted in position by removable screws 50 and provides a mounting on its rear wall for certain of the electrical parts to be hereinafter referred to. At spaced points on its top, rear and end walls, the container 49 has screens 51 mounted therethrough, see Figs. 2 to 4, for venting heat generated within the control box 25.

For a further description of the sound reproducing apparatus, particular reference will be had to the schematic wiring diagram—Figs. 16 to 18—from which it will be noted that the apparatus includes an amplifier circuit shown in Figs. 17 and 18. That amplifier circuit is controlled by a master relay 52 of the double-pole-double-throw type. The master relay 52 includes a coil 53 for moving a core in one direction when energized. The core is connected to a pair of arms 54 and 55. When the coil 53 is deenergized, the arm 54 is closed against a blank contact 56 and the arm 55 is closed against a contact 57. When the coil 53 is energized, the arm 54 is closed against a contact 58 and the arm 55 is closed against a contact 59.

Novel means is provided for energizing the coil 53 of the master relay 52 for closing the arms 54 and 55 against the contacts 58 and 59. That means comprises a plug 60, see Figs. 1 and 16, for insertion into a conventional receptacle of a source of 110 volt A. C. electrical energy. Extending from the plug 60 there are leads 61 and 62 connected to the prongs 63 of a second plug 64. The prongs 63 of the plug 64 are arranged to be received in a 110 volt input receptacle 65 mounted through the rear wall of the container 49, see Fig. 2. Extending from one side of the receptacle 65, there is a lead 66 which is connected at its other end to the coil 53 of the master relay 52. Connected in series in the lead 66, there is a manually operable master switch 67. The master switch 67, as shown in Figs. 1 and 3, is mounted through the top wall 42 of the control box 25 to be thrown manually between "on" and "off" positions to control the supply of all electrical energy to the sound reproducing apparatus. Between the coil 53 of the master relay 52 and the master switch 67, the lead 66 has a grounded branch lead 68.

Extending from the other side of the receptacle 65, there is a lead 69 which is connected to one side of the primary 70 of a step-down transformer 71. The other side of that primary 70 is connected by a lead 72 to the lead 66 on the inward side of the master switch 67. Thus, when the master switch 67 is closed the primary 70 of the transformer 71 will be energized along the lead 61, the lead 66, the lead 72, the primary 70, the lead 69 to the lead 62.

The step-down transformer 71 is provided for supplying a reduced current voltage to operate the 6 volt coil 73 of a normally open control relay 74. The control relay 74 has an arm 75 arranged to be closed against a contact 76 when the coil 73 of the control relay 74 is closed. The step-down transformer 71 acts to step down the normal 110 volt current to 6 volts the current at which the coil 73 of the control relay 74 is designed to operate. The secondary 77 of the transformer 71 as controlled by the foot pad 27 will supply the current for energizing the coil 73 of the control relay 74.

Figure 15:
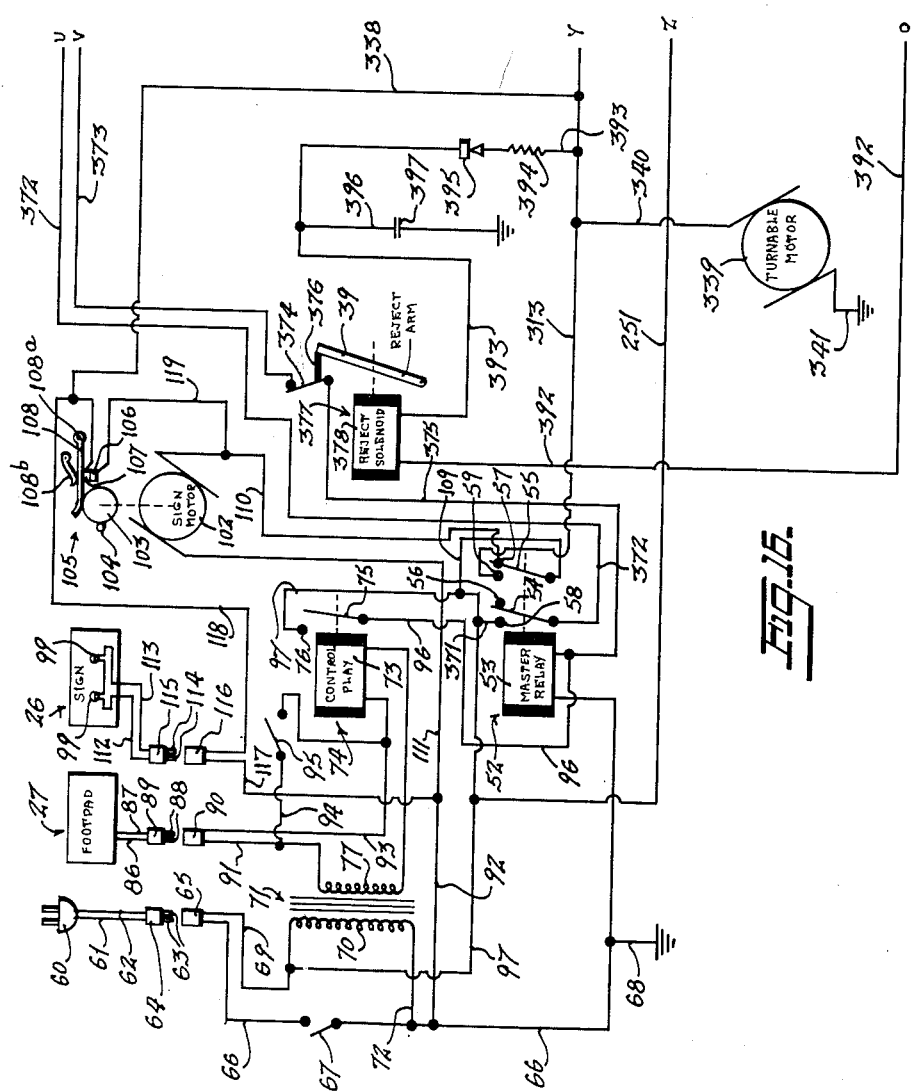
Fig. 15 is an enlarged detailed view of a portion of Fig. 14.

Constructional details of the foot pad 27 are illustrated in Figs. 13 to 15 and from which it will be noted that the pad is comprised of superimposed wire screens 78 and 79 separated from each other by a thin layer of insulation material 80. The layer of insulation material 80 is preferably a thin sheet of paper and at spaced points, the layer 80 is provided with holes 81, see particularly Figs. 13 and 15. Extended along the top face of the top screen 78 there is a thin layer of insulation material 82 preferably of paper and extended along the bottom face of the bottom screen 79 there is a thin layer of insulation material 83 preferably of paper. The entire sandwich composed of the screens 78 and 79 and the layers of insulation material 80, 82 and 83 is housed within a casing 84 of rubber molded about the same. The top face of the rubber casing 84 is provided with upwardly projected ribs 85 providing a grip for a person standing on the pad. The foot pad 27 is provided to be positioned on the floor in front of the sound reproducing apparatus to be stepped on by a person desiring to start a cycle of operation of the apparatus by energizing the master relay 52.

Due to the resilient nature of the casing 84, the weight of the person stepping on the foot pad 27 will cause the screens 78 and 79 to be deformed through the holes 81 in the layer of insulation material 80 and electrically contact one another. Extending from the upper screen 78 there is a lead 86 and extending from the lower screen 79 there is a lead 87.

Referring again to the schematic wiring diagram, Figs. 16 to 18, it will be noted that the leads 86 and 87 from the foot pad 27 are connected to the prongs 88 of a plug 89. The prongs 88 of the plug 89 are arranged to be received in a receptacle 90 mounted through the rear wall of the metallic container 49, see Fig. 2. Extending from one side of the receptacle 90 there is a lead 91 which is connected to one side of the secondary 77 of the transformer 71. A lead 92 extends from the other side of the secondary 77 to one side of the coil 73 of the control relay 74. A third lead 93 extends from the coil 73 to the other side of the receptacle 90. The use of the plug 89 and the receptacle 90 permits the foot pad 27 to be separated from the control box 25 when moving the apparatus or for making repairs.

With the primary 70 of the step-down transformer 71 energized, the coil 73 of the control relay 74 will be energized if the screens 78 and 79 are contacted, by the passage of current along the lead 86, the lead 91, through the secondary 77 of the transformer 71, the lead 92, the coil 73, the lead 93 and the lead 87 back to the foot pad 27.

It will be appreciated, of course, that a 6 volt current is used in the circuit for the coil 73 of the control relay 74 to eliminate possible electrocution of the person stepping on the foot pad especially with wet shoes and if the casing 84 should be worn away unnoticed exposing the top screen 78 to contact by such wet shoes.

Auxiliary means is provided for closing the 6 volt circuit through the coil 73 of the control relay 74 without requiring stepping on the foot pad 27. That auxiliary means comprises a lead 94 connected between the leads 91 and 93 in shunt of the foot pad 27. Connected in series in the lead 94 there is a normally open auxiliary switch 95 of the depressible snap-action type. As shown in Figs. 3 and 4, the auxiliary switch 95 is mounted through the top wall 42 to be manually depressed. When the switch 95 is closed by being depressed the coil 73 will be energized by current passing from the secondary 77 along the lead 91, the lead 94 through the switch 95, the lead 93, the coil 73, the lead 92 back to the other side of the secondary 77 of the step-down transformer 71.

Normally, the arm 75 of the control relay 74 is spaced from the contact 76 and is connected by a lead 96 to the other side of the coil 53 of the master relay 52. Extending from the contact 76, there is a lead 97 which is connected to the lead 69 from the source of electrical energy, between the receptacle 65 and the primary 70. Thus, with the master switch 67 in the "on" position and the arm 75 of the control relay 74 closed against the contact 76, the coil 53 of the master relay 52 will be energized by current passing through the lead 61, the lead 66, the coil 53, the lead 96, the arm 75, the contact 76, the lead 97, the lead 69 and the lead 62 back to the source of electrical energy. When the coil 53 of the master relay 52 is closed, the arms 54 and 55 will be pivoted away from the contacts 56 and 57 and closed against the contacts 58 and 59.

The electric sign 26, as will be determined from Figs. 1 and 16, includes a hollow base 98 of metal or similar material and which encloses a pair of series connected light bulbs 99, see Fig. 16. Upstanding from the base 98, there is a transparent plate 100 formed of glass, a transparent synthetic resin or other similar material. The bottom edge portion of the transparent plate 100 is supported in a slot, not shown, formed in the base 98 over the light bulbs 99 so that the plate will be illuminated by rays of light passing from the bulbs 99. The surface of the transparent plate 100 has imprinted thereon or otherwise applied thereto certain indicia 101. When the sound reproducing apparatus is constructed for sales promotion work as shown on the drawings, the indicia preferably comprises instructions for starting an operation of the apparatus—referred to on the sign as an Automatic Salesman—by stepping on the foot pad 27. Other constructional details of the sign 26 will not be given in this specification as such details are generally known by those skilled in the art and form no part of the present invention.

Circuit means is provided for causing the sign 26 to be lit and periodically blinked while the master relay 52 is deenergized and the master switch 67 is in its closed position. The operative parts of that circuit means are diagrammatically illustrated in Fig. 16 and are comprised of a sign motor 102 having a cam 103 including a high point 104, mounted fixedly on its driven shaft so that the cam 103 will be rotated by the motor 102. The cam 103 is designed to operate a flicker switch 105 having a pair of contacts 106 and 107. The contact 106 is stationarily mounted and normally engaged by the contact 106 which is mounted on an intermediate portion of an arm 108 of insulation material. The arm 108 is pivoted at one end on a pin 108ᵃ and has its other end resting on the cam 103. The arm 108 is resiliently urged by a leaf spring 108ᵇ, into a position in which its contact 107 engages the contact 106 and the free end of the arm rests against the cam 103. Thus, during each revolution of the cam 103, the high point 104 will engage the arm 108 and pivot it against the leaf spring 108ᵇ causing the contact 106 to momentarily move away from the contact 107 opening the flicker switch 105. The sign motor 102 preferably includes some gear reduction mechanism, not shown, or similar mechanism for reducing the rate of revolution of the cam so that the cam 103 will make one complete revolution once every eleven seconds causing the flicker switch 105 to be opened once every eleven seconds.

The electrical connections for illuminating the sign 26 and operating the sign motor 102 during the time that the master switch 67 is closed and the coil 53 of the master relay 52 is deenergized, includes a lead 109 which is connected at one end to the lead 97 between its connection with the contact 76 and its point of connection to the lead 69. The other end of the lead 109 is connected to the arm 55 of the master relay 52 which is engaged with the contact 57 in the deenergized position of the relay. A lead 110 from the contact 57 is connected at its other end to one side of the sign motor. A lead 111 from the other side of the sign motor 102 is connected to the lead 66 on the inward side of the master switch 67. Thus, current for rotating the motor will pass through the lead 61, to the lead 66, through the closed master switch 67, along the lead 111, through the sign motor 102, along the lead 110, to the contact 57, through the arm 55, along the lead 109, the lead 97, the lead 69 and into the lead 62 back to the source.

Simultaneously, the sign 26 will be illuminated through the medium of leads 112 and 113 which extend from the series connected light bulbs 99 mounted in the base 98 of the sign. The leads 112 and 113 are connected to the prongs 114 of a plug 115. The prongs 114 are arranged to be inserted into a sign outlet receptacle 116 mounted in position through the back wall of the metallic container 49, see Fig. 2. The use of the plug 115, as in the case of the plugs 64 and 89 previously referred to, permits the sign 26 to be completely disconnected from the control box 25 when desired. A lead 117 extended from one side of the receptacle 116 is connected to the lead 111 between the sign motor 102 and its point of connection with the lead 66.

Another lead 118 from the other side of the receptacle 116 is connected to the contact 107. A lead 119 connected at one end to the contact 106 is connected at its other end to the lead 110 between the sign motor 102 and the contact 57. Again, with the master switch 67 closed and the coil 53 of the master relay deenergized, the sign will be illuminated by current passing through the lead 61, through the closed master switch 67 and the lead 66 to the lead 111, through the lead 117, the lead 112, through the light bulbs 99, along the leads 113 and 118, through the closed contacts 106 and 107, the lead 119 and the contact 110 to the contact 57 and from that contact back to the source along the same path as that described for the sign motor. In the position of the arm 55 shown in Fig. 16, the sign 26 will be illuminated as long as the contacts 106 and 107 engage one another. However, the moment the high point 104 on the cam 103 engages the arm 108, it will be pivoted against the action of the leaf spring 108b momentarily spacing the contacts 106 and 107 breaking the circuit through the sign causing the sign to be momentarily turned off. A circuit, to be hereinafter described, is also provided for causing the sign to be continuously illuminated during the time that the coil 53 of the master relay 52 is energized.

Included in the circuits of the reproducing apparatus, there is a manually operable changeover switch 120 which can be set in either of two positions for changing the nature of the operation of the apparatus—that is whether the messages are to be played through the main speaker 46 and the auxiliary speakers 28 or whether the messages are to be played one after the other through only the main speaker 46, as will become clear as the specification proceeds. The construction of that changeover switch 120 is diagrammatically illustrated in Fig. 18 and consists of superimposed concentric stationary rings 121 and 122 of insulation material. Positioned concentrically within each of the rings 121 and 122 there are discs 123 and 124 also of insulation material. The discs 123 and 124 are ganged together by a vertically extended rod, indicated by the dotted line 125 in Fig. 18, so that as the rod is turned in one direction or the other the discs 123 and 124 will be similarly turned with relation to the rings 121 and 122. With the rings 121 and 122 fixedly supported on the bottom face of the top wall 42, the top end of the rod 125 is turnably extended through that top wall and has a knob 126 mounted on that top end over the top face of the top wall 42. The knob 126 includes a pointer 127 which registers on an indicator plate 128 inscribed with the numerals 1 and 2, see Figs. 3 and 18, for indicating which of the two possible positions the changeover switch 120 is in. Preferably provided in connection with the rod 125, but not shown on the drawings, there is means for limiting rotational or turning movements of the rod 125 to the two positions indicated by the numerals on the indicator plate 128.

Fixedly mounted on the ring 121, there is a radially extended contact strip 129 which has its inner end extended to make electrical contact with a contact ring 130 stationarily mounted on the disc 123. At one point, the contact ring 130 is formed with a radially extended projection 131 which makes electrical contact with a radially extended contact strip 132 fixedly mounted on the ring 121, when the pointer of the knob 126 is set to the number "1" position, as shown in Fig. 18. When the knob 126 is turned to the number "2" position, the ring 123 is then turned causing the projection 131 to make electrical contact with a second contact strip 133 which is also radially extended and stationarily mounted on the ring 121. The contact strip 129 is engaged with the contact ring 130 in either of the two turned positions of the disc 123.

Turning now to the bottom ring 122, there is stationarily mounted on diametrically opposite sides of the ring 122 radially extended contact strips 134 and 135. Mounted on the disc 124 there are opposed half rings 136 and 137 of metallic material. The strips 134 and 135 are also constructed of metallic material and the inner end of the strip 134 contacts the half ring 136 and the inner end of the strip 135 contacts the half ring 137. At one point the contact ring 136 carries a radially extended projection 138, which in the number "1" position of the changeover switch 120, makes electrical contact with a radially extended metallic contact strip 139 stationarily mounted on the ring 122. However, when the changeover switch is turned to its number "2" position, the projection 138 merely moves away from the contact strip 139 breaking its electrical contact with that strip and moves to an idle position between the contact strips 134 and 139. The contact strip 134 makes contacts with the half ring 136 in each of the two positions of the changeover switch. The other half ring 137 is also formed at one point with a radially extended projection 140 which contacts a radially extended metallic contact strip 141 fixedly mounted on the ring 122 in the number "1" position of the changeover switch 120, as shown in Fig. 18. When the changeover switch is turned to its number "2" position, the disc 124 is turned causing the projection 140 to move over and make electrical contact with a second radially extended metallic contact strip 142 mounted on the ring 122. The inner end of the contact strip 135 makes electrical contact with the half ring 137 in each of the two positions of the changeover switch 120. All the electrical connections to the changeover switch 120 will be hereinafter described.

Provided for controlling the number of auxiliary speakers 28 that will be in operation when the changeover switch 120 is in its number "1" position, there is a selector switch 143 which is manually operable to bring one or more of the auxiliary speakers 28 into operation. The selector switch 143 is diagrammatically illustrated in Fig. 18 and constructional details of that switch are shown in Figs. 5 to 12. The selector switch 143 is divided into two main parts—the manually settable part and the electrically operated part.

First, reference will be had to the manually settable part which is comprised of a metallic plate 144 which at its center is formed with an integral sleeve 145 projected upward through a hole formed in the top wall 42, see Fig. 5. Positioned on the top face of the top wall 42, concentric with the sleeve 145, there is an indicator disc 146 with a nut 147 threaded onto the projected top end of the sleeve 145 and against the disc 146 fixedly securing the plate 144 and the disc 146 in position with relation to the top wall 42.

The exposed face of the indicator disc 146, as shown in Fig. 3, is inscribed with the legend "off" and the numerals from "1" to "5" all equally spaced about the disc 146. Positioned on the sleeve 145 and rested on the nut 147, there is a metallic strip 148 which extends radially from the sleeve and has its free end bent upward forming a stop member 149. The strip 148 is retained in a desired fixed position on the sleeve 145 by a second nut 150 threaded onto the top portion of the sleeve and against the top face of that metallic strip 148. The nut 150 acts in the nature of a lock nut for the nut 147 insuring secure mounting for the plate 144.

Rotatively extended through the sleeve 145 there is a shaft 151 which has its top portion projected above the top end of the sleeve 145. Fixedly mounted in position on the projected top end portion of that shaft 151 there is a knob 152. The knob 152 is secured in position by means of a set screw 153 threaded through the side of the knob 152 and tightened against the side of the shaft 151. One side of the knob 152 is formed with a projection 154 for registering with the legend "off" or the numbers inscribed on the face of the indicator disc 146. The metallic strip 148 is secured in position on the sleeve 145 so that its stop member 149 will be engaged by the side of the projection 154 when aligned with the legend "off" so as to limit further turning of the knob 152 in a counterclockwise direction, as viewed in Fig. 3.

Spaced below the plate 144, there is a circular wall 155 of insulation material having a hole 156 at its center and having four equally spaced ears 156 projected radially from its periphery. Depending from the corners of the plate 144 there are four bolts 157 which pass through holes formed in the outer ends of the ears 156. For retaining the circular wall 155 in the desired spaced position with relation to the plate 144, there is positioned on each of the bolts 157 a bushing 158 between the adjacent faces of the plate 144 and the circular wall 155.

Positioned below the circular wall 155 there is an L-shaped member 159 having a horizontal arm 159a and a depending vertical arm 159b. The horizontal arm 159a is formed with holes for the passage of the bottom end portions of the bolts 157 and the L-shaped member 159 is retained in the desired spaced position with relation to the bottom face of the circular wall 155 by means of tubular bushings 160 positioned on the bolts 157 between the adjacent faces of the circular wall 155 and the horizontal arm 159a of the L-shaped member. For retaining the circular wall 155, the L-shaped member 159 and the bushings 158 and 160 in position on the bolts, nuts 161 are threaded onto the bottom ends of the bolts 157 and against the bottom face of the horizontal arm 159a of the L-shaped member 159.

Rotatively positioned within the hole 156 of the circular wall 155, there is a disc 162 of insulation material which is fixedly mounted on the bottom end of the shaft 151 to rotate therewith as the shaft 151 is turned through the medium of the knob 152. Fixedly mounted on the bottom face of the circular wall 155 concentric with its hole 156, there is a metallic contact ring 163 which at one point is formed with a radially extended projection 163a for having an electric lead connected thereto as will be hereinafter described. Fixedly mounted on the circular wall 155, outward of the contact ring 163, there are six contact strips 164, 165, 166, 167, 168 and 169. The contact strips 164 to 169 are all made of metal and are alike in formation and have their inner ends curved to extend downward beyond the bottom face of the contact ring 163 so as not to make electrical contact therewith, as shown in Fig. 5.

Fixedly secured to the bottom face of the disc 162 there is a metallic contact ring 170 which is formed at one side thereof with a spaced pair of radially outwardly extended projections 171 which make electrical contact with the contact ring 163. Secured to the bottom face of the contact ring 170, there is a metallic half ring 172 which is formed with a radially outward extended projection 173, which in Figs. 5, 6 and 18 is shown in electrical contact with the inner end of the contact strip 164—the position of the parts when the knob 152 of the selector switch 143 is at the "off" setting shown in Figs. 3 and 5. As the knob 152 is turned to the number "1" position of the selector switch, the projection 173 will make electrical contact with the contact strip 165 and in the number "2" position with the contact strip 166 and so around until in the number "5" position the projection 173 will be contacted with the strip 169. The projections 171 of the contact ring 170 make electrical contact with the contact ring 163 in all of the set positions of the selector switch 143.

Means is provided for retaining the shaft 151 in any position in which it might be turned and for in turn retaining the disc 162 in a fixed position in which the projection 173 will be electrically contacted with the inner end of one of the contact strip 164 to 169. That retaining means comprises a small wheel 174 which is fixedly mounted on the shaft 151 between the adjacent faces of the top wall 42 and the metallic plate 144. The periphery of the small wheel 174 is formed with six equally spaced notches 175. An elongated leaf spring 176 has one end securely anchored to one of the bushings 158 and its other end bent into a semicircular end portion 177 which fits into one of the notches 175. As the shaft 151 is turned, the semicircular end portion 177 snaps into and out of the notches 175 restraining the shaft 151 against free rotative movement and so holds the shaft in any position into which it is turned through the medium of the knob 152.

Constructional details of the electrically operated part of the selector switch 143 are given in Figs. 5 and 8 to 12 with a diagrammatic illustration of that part in Fig. 18. That electrically operated part is comprised of a U-shaped frame 178 which is turned on its side to have a top arm 178a, a bottom arm 178b and a vertically disposed intermediate arm 178c. The U-shaped frame 178 is positioned against the depending vertical arm 159b of the L-shaped member 159. Welded to the outer faces of the arms 178a and 178b of the U-shaped frame 178, adjacent the vertical arm 159b, there are angle irons 179. The vertically extended arms of the angle irons 179 are secured to the vertical arm 159b by spaced screws 180.

Concentrically rotatively extended through the intermediate arm 178c of the U-shaped frame 178, there is a horizontally disposed shaft 181. Mounted on the end of that shaft 181 on the inner face of the intermediate arm 178c, there is a ratchet wheel 182 secured in position by a pin 183, see Fig. 11. The periphery of the ratchet wheel 182 is formed with a plurality of teeth 182a shown on the drawings as comprising twenty such teeth. The use of twenty teeth is arbitrary and their number can be increased or decreased as controlled by the maximum number of auxiliary speakers it may be desired to use with the machine. The use of twenty teeth permits a maximum of nineteen auxiliary speakers 28 to be used with one main speaker 46.

Mounted on the shaft 181, between the adjacent faces of the ratchet wheel 182 and the intermediate arm 178c of the U-shaped frame 178, there is a coil spring 184, see Fig. 11. That coil spring 184 has one end attached to the ratchet wheel 182 and its other end attached to the intermediate arm 178c to turn the ratchet wheel 182 and in turn the shaft 181 into a position in which a pin 185 carried by the ratchet wheel 182 engages a stop member 186 which projects from the intermediate arm 178c. The engagement of the pin 185 with the stop member 186 restrains the coil spring 184 from turning the ratchet wheel further in a counterclockwise direction as viewed in Figs. 5 and 18.

Mounted on the outer face of the intermediate arm 178c of the U-shaped frame 178, there is a spaced pair of insulation plates 187 and 188. Those plates 187 and 188 are secured to the intermediate arm 178c by screws 189 which pass through holes in the corners of the plates 187 and 188 and which are threaded into the intermediate arm 178c. The plates 187 are retained spaced from each and from the intermediate arm 178c by means of bushings 190 positioned on the screws 189.

The insulation plates 187 and 188 are formed with concentric holes 191, see particularly Fig. 11, through which the shaft 181 freely extends. The insulation plate 187, concentric with its hole 191, is provided with a plurality of contact pins 192 arranged in a circle. The insulation plate 188, likewise, is provided, concentric with its hole 191, with a plurality of contact pins 193 also arranged in a circle. The pins 192 and 193 are mounted through the respective insulation plates, as illustrated in the case of the pin 192 in Fig. 12, to have electric leads soldered to those pins at the outer faces of the insulation plates 187 and 188. On the drawings, the groups of pins 192 and 193 are illustrated as being twenty in number; one pin in each group for one of the ratchet teeth 182a of the ratchet wheel 182. Again, the number of contact pins in each group is arbitrary for the same reasons explained in connection with the teeth of the ratchet wheel 182. In the embodiment of the sound producing apparatus shown on the drawings, only five auxiliary speakers 28 are shown in use with the main speaker 46 making a total of six speakers in all, so that only six contact pins in each group are being used. The number of contact pins used will increase with the number of auxiliary speakers used and the only change in the selector switch 143 will be the substitution of a manually operative part having a greater number of contact strips—similar to the contact strips 164 to 169—and a corresponding greater number of possible settings of the knob 152.

Positioned on the shaft 181 between the adjacent faces of the shaft 181, there are metallic contact arms 194 and 195—the arm 194 for engaging the contact pins 192 and the arm 195 for engaging the contact pins 193. The inner ends of the arms 194 and 195 are sandwiched between insulative fiber discs 196 with the arms and the discs being secured together by means of rivets 197, see Fig. 11. The fiber discs 196 are formed with concentric holes to have a snug fit on the shaft 181, but the arms 194 and 195 are formed with slightly enlarged holes to have the shaft 181 pass therethrough without making electrical contact therewith, all as shown in Fig. 11. The arms 194 and 195 are retained in the desired spaced positions on the shaft 181 by means of tube sections 198 engaged on the shaft 181 between the adjacent faces of the arms and on opposite sides of the arms. All of the parts are retained in position on the shaft 181 by means of a nut 199 threaded onto a reduced outer end portion of the shaft 181 with a washer 200 on that reduced outer end portion between the nut 199 and the outermost tube section 198, see Fig. 11.

The arms 194 and 195 are made of flexible spring metal and have their free outer ends canted to bear with good electrical contact against the contact pins 192 or 193 of the respective group.

Provided for making electrical contact with the contact arms 194 and 195 there are finger members 201 and 202; with the finger member 201 engaging the arm 194 and the finger member 202 engaging the arm 195. Each of the finger members 201 or 202 has one end secured to the respective insulation plate 187 or 188 by means of a rivet 203. The rivets 203 extend completely through the respective insulation plate, as clearly illustrated in the case of the rivet 203 in Fig. 11, to have electric leads soldered to the ends thereof at the outer faces of the insulation plates 187 and 188. The free ends of the finger members 201 and 202 are bent to bear with good electrical contact against the adjacent faces of the arms 194 and 195 in all of the rotative positions of those arms. During rotation of the arms 194 and 195, it will be appreciated that those arms move freely over the finger members 201 and 202 without interference therefrom.

Mounted on the inner face of the bottom arm 178b of the U-shaped frame 178, there is a change relay 204, see Figs. 5, 8 and 18, for advancing the ratchet wheel 182 one tooth 182a each time the coil 205 of that change relay is energized. Movement of the ratchet wheel 182, by the change relay 204, is in a clockwise direction, as viewed in Fig. 5, in which the pin 185 moves away from the stop member 186. The arms 194 and 195, as viewed in Figs. 9, 10 and 18, will be similarly moved in a clockwise direction to advance those arms from one contact pin to the next. The positions of the arms 194 and 195, shown in those Figs. 9, 10 and 18, is the normal position for those arms when the pin 185 is against the stop member 186.

To accomplish rotative movement of the ratchet wheel 182 the desired one tooth for each energization of the change relay 204, there is pivotally mounted on the body of that relay a metallic arm 206 arranged to be attracted toward the coil 205 by the core thereof when that coil is energized. The arm 206 is pivotally retained in position on the body of the change relay 204 by means of a bolt 207 and is pivoted in a direction away from the coil 205 by a contraction spring 208. Mounted on the arm 206 to swing in a direction at right angles to the direction of pivoting of the arm 206, there is a lever 209 which is pivotally mounted on the arm 206 by a pin 210. The pivotal movement of the lever 209 is limited to a narrow arc by spaced pins 211 which project from the arm 206. An intermediate portion of the lever 209 is located between the pins 211 and a bar 212 is mounted between the free ends of the pins 211 retaining the lever 209 extended paralled to the arm 206 and retaining that lever against any possible movement in a direction away from the arm 206.

The free end of the lever 209 is bent at right angles to the end thereof which is pivotally mounted on the arm 206 to engage between adjacent teeth 182a of the ratchet wheel 182 and cause that wheel to be advanced one tooth each time the arm 206 is pivoted. The pivotal mounting of the lever 209 on the arm 206 takes into account the arc through which the teeth of the ratchet wheel 182 move and a spring 213 is provided for pivoting the lever 209 toward the teeth of the ratchet wheel. That spring 213 operates between the lever 209, closely adjacent its free end, and a lug 214 cut from the intermediate arm 178°.

A pawl 215 pivotally mounted on a post 216, see Fig. 8, which extends from the intermediate arm 178°, has one end engaged between adjacent teeth 182ª of the ratchet wheel 182 for restraining the spring 184 from turning the ratchet wheel 182 back to its starting position each time it is advanced one ratchet tooth. The pawl 215 is resiliently retained in an operative position by a spring 217 mounted on the post 216. Each time that the ratchet wheel 182 is advanced one tooth, one of the teeth will merely idle past the adjacent end of the pawl 215 with the pawl then snapping behind the next adjacent tooth to be restrained by the pawl from return movement by its spring 184.

Electrically operated means is provided for moving the pawl 215 to an inoperative position against the action of its spring 217 to free the ratchet wheel 182 to be returned to its starting position by its spring 184, when an operating cycle for which the selector switch 143 has been set has been completed. That electrically operated means comprises a release relay 218 mounted on a bracket arm 219 cut from the top arm 178ª of the U-shaped frame 178. Pivotally mounted on the body of the release relay 218, there is a plate 220 which is urged away from the coil 221 of the release relay by a contraction spring 222, see Fig. 5. When the coil 221 of the relay 218 is energized, the plate 220 will be pivoted toward the coil against the action of the spring 222. The plate 220 is formed at its free end with a projecting lug 223, see Fig. 8, disposed to engage the free end of the pawl when the plate 220 is pivoted against the action of the spring 222. Engagement of the lug 223 with the pawl 215 pivots that pawl against the action of the spring 217 moving the pawl clear of the teeth 182ª of the ratchet wheel 182 so that the spring 184 can turn the wheel back in a counterclockwise direction as viewed in Fig. 5, until the pin 185 reengages the stop member 186. It being appreciated that in all inoperative or deenergized positions of the change relay 204, the lever 209 is clear of the ratchet teeth 182ª so that the ratchet wheel 182 is free to be turned back by the spring 184. Back rotation of the ratchet wheel 182 causes the shaft 181 to be similarly turned returning the contact arms 194 and 195 to their starting positions illustrated in Figs. 9, 10 and 18.

From the foregoing description of the construction of the manually operative part and the electrically operated part of the selector switch 143 it is believed that the operation of the switch will be clear. The electrical connections to the various parts of that switch will be given as the specification proceeds.

The essential parts of the amplifier circuit are shown in the Fig. 17 section of the schematic wiring diagram. That amplifier circuit is divided into parts consisting of a sound circuit made up of a duplex-diode-triode tube 224, a beam power amplifier tube 225 and a sound output transformer 226 and a signal circuit made up of a duplex-diode-triode tube 227, a beam power amplifier tube 228 and a signal output transformer 229 for energizing the coil 230 of a signal relay 231. The duplex-diode-triode tubes 224 and 227 are alike in construction and each has a plate 232, a grid 233, a diode plate 234, a cathode 235 and a heater 236. The diode plates 234 and the cathodes 235 are tied together by leads 237.

The two beam power amplifier tubes 225 and 228 are also alike in construction and each includes a plate 238, a screen 239, a grid 240, a cathode 241 and a heater 242. Also, included in the amplifier circuit there is a triode tube 243 having a plate 244, a grid 245, a cathode 246 and a heater 247.

A circuit is provided for causing the heaters 236, 242 and 247 of the tubes to be energized the moment the master switch 67 is closed so that the amplifier circuit will be ready for instant use the moment the master relay 52 is energized bringing the remainder of the amplifier circuit into operation. That circuit for the heaters of the tubes includes a filament transformer 248 having the usual primary 249 and secondary 250. A lead 251, see Figs. 16 and 17, has one end connected to one side of the primary 249 of the transformer 248. The other end of the lead 251 is connected to the lead 97 between the contact 76 and the lead 69. The other side of the primary 249 of the transformer 248 is ground by a lead 252. Thus, when the switch 67 is closed, current for energizing the primary 249 of the transformer 248 passes along the lead 61, the lead 66 through the closed master switch 67, to the grounded lead 68, to the grounded lead 252, through the primary 249, along the lead 251 to the lead 97, to the lead 69 and the lead 62 back to the source. Extending from the secondary 250 of the filament transformer 248 there are parallel leads 253 and 254 connected at their free ends to the heater 242 of the tube 228. Parallelly connected leads 255 extend from the leads 253 and 254 to the heater 242 of the tube 225, with similar leads 256 extending from the leads 253 and 254 to the heater 236 of the tube 224. Parallel leads 257 connect the heater 236 of the tube 227 to the leads 253 and 254 with the heater 247 of the tube 243 connected to the leads 253 and 254 by leads 258. Thus, all of the heaters of the tubes are connected in parallel with the secondary 250 of the filament transformer 248 so that upon energization of the primary 249 all of the heaters will be energized.

The transcribing arm 36 carries the usual electrical parts, not shown, for converting vibrations of the needle 38 in the record groove into electrical vibrations as is generally known in the art. One side of that electrical mechanism of the transcribing arm 36 is grounded through a lead 259. Extending from the other side of the electrical mechanism, see Fig. 17, there is a lead 260 connected to one end of the winding 261 of a variable volume control 262 for the sound circuit portion of the amplifier circuit. The other side of the winding 261 is grounded through a lead 263. The adjustable arm 264 of the volume control 262 is connected to the grid 233 of the tube 224 by a lead 265. The volume control 262 is manually adjustable by means of a knob 266 positioned above the top wall 42, see Figs. 1, 3 and 4.

A branch lead 267 from the lead 260 is connected to one end of the winding 268 of a signal excitation volume control 269. The other end of the winding 268 is grounded through a lead 270. The adjustable arm 271 is connected by a lead 272 to the grid 233 of the tube 227. The volume control 269 has a control knob 273 exposed above the top face of the top wall to be turned to adjust the sensitivity of the signal from the record to a proper level to excite the coil 230 of the signal relay 231. The knob 273 carries an indicator plate 274 which registers with a pointer 275 mounted on the top face of the top wall 42, see Fig. 3. A screw type adjustable lock 276 mounted on the wall 42 is arranged to be tightened against the periphery of the indicator plate 274 for securing the knob 273 in the properly adjusted position of the excitation volume control 269 so that the signals will be passed to the signal relay 231 at the proper level to excite or energize its coil 230.

Extending from the cathodes of the tubes 224, 225, 227 and 228 there is a grounded lead 277 which includes in series a resistor 278. A parallel lead 279 is connected at its ends to each of the leads 277 at opposite ends of the resistors 278 and those parallel leads 279 include in series condensers 280. Connected to the cathode 246 of the tube 243, there is a grounded lead 281 which includes in series a resistor 282. A lead 283 is connected at one end to the lead 281 at the grounded end of the resistor 282 and has its other end connected to the grid 245 of the tube 243. The lead 283 includes in series a resistor 284. Extending from the plate 232 of the tube 224, there is a lead 285 which includes in series a condenser 286 and which lead 285 is connected at its other end to the grid 240 of the tube 225. A grounded lead 287 is connected to the lead 285, between the condenser 286 and the grid 240, and includes in series a resistor 288. A lead 289 from the plate 238 of the tube 225 is connected at its other end to one end of the primary 290 of the output transformer 226. The lead 289 has one end of a grounded branch lead 291 connected thereto and which includes in series a condenser 292. A lead 293 is connected at one end to the other side of the primary 290 of the sound output transformer 226 and has its other end connected to the screen 239 of the tube 225, to excite the primary 291 of the output transformer.

A lead 294 extends from the plate 232 of the tube 227 and is connected at its other end to the grid 240 of the tube 228. The lead 294 includes in series a condenser 295. Connected to the lead 294 between the condenser 295 and the grid 240, there is a grounded lead 296 which includes in series a resistor 297. Extending from the plate 238 of the tube 228, there is a lead 298 which is connected to one end of the primary 299 of the signal transformer 229. A grounded lead 300 is connected to the lead 298 between the plate 238 and the primary 299 and includes in series a condenser 301. A lead 302 from the other side of the primary 299 of the signal output transformer 229 is connected to the screen 239 of the tube 228 to excite the primary 299 of the signal output transformer 229 when the needle 38 of the transcribing arm 36 picks up a signal from the record and in accordance with the setting of the excitation volume control 269. The secondary 303 of the signal output transformer 229 has a lead 304 connected to one end thereof with the other end of the lead 304 connected to one side of the coil 230 of the signal relay 231. A lead 305 from the other side of the coil 230 is connected to the other side of the secondary 303 completing the circuit from the secondary through the coil 230 to energize the coil each time a signal is picked up by the needle 38. The lead 305 includes in series a selenium rectifier 306. Also connected to the lead 305 between the coil 230 and the rectifier 306, there is a lead 307 which is connected at its other end to the lead 304 and which includes in series a condenser 308.

The signal relay 231, in addition to the coil 230, has a pivotally mounted arm 309 which is grounded through a lead 310. When the coil 230 is deenergized, as shown in Fig. 17, the free end of the arm 309 is closed against a contact 311. However, when the coil 230 is energized, the free end of the arm 309 is pulled over to make electrical contact with a contact 312.

The circuit from the master relay 52 for energizing the complete amplifier circuit when the coil 53 of that relay is energized, can be traced along a lead 313, see Figs. 16 and 17, which is connected at one end to the contact 59 of the master relay 52 and at its other end to a resistor 314. A lead 315 connects the other end of the resistor 314 to one side of a selenium rectifier 316. The other side of the rectifier 316 is connected by a lead 317 to one side of a resistor 318. A lead 319 from the other side of the resistor 318 is connected to the same side of the primary 290 of the output transformer 226 to which the lead 293 is connected. A branch lead 320 from the lead 319 is connected to the same side of the primary 299 of the signal transformer 229 to which the lead 302 is connected.

Branch leads 321 and 322 are connected to the leads 317 and 319 on opposite sides of the resistor 318 and each of the leads 321 and 322 includes in series a condenser 323. The other ends of the leads 321 and 322 are grounded through a common lead 324. A lead 325 connected to the lead 139, outward of the resistor 318, is connected to the lead 294 between the plate 232 and the condenser 295 and includes in series a resistor 326. A lead 327, similar to the lead 325, is connected at one end to the lead 319 and has its other end connected to the lead 285 between the plate 232 and the condenser 286. The lead 327 includes in series a resistor 328.

Also, connected to the lead 319, there is a lead 329 which is connected at its other end to one side of the coil 330 of a normally open plate relay 331. A lead 332 connects the other side of the coil 330 to the plate 244 of the tube 243. The plate relay 331 includes an arm 333 which is inoperative when the coil 330 is deenergized but which is closed against a contact 334 when the coil 330 is energized. Extended from the lead 332, there is a grounded branch lead 335 which includes in series a condenser 336. A lead 337 connected at one end to the lead 335, between its grounded end and the condenser 336, has its other end connected to the arm 333 of the plate relay 331.

The moment the coil 53 of the master relay 52 is energized by energization of the control relay 74 as previously described, the arm 55 will be pulled over to electrically engage the contact 59. Current for the amplifier circuit will then come from the source along the lead 62, the lead 69, the lead 97, the lead 109, through the arm 55, the contact 59, the lead 313 to the resistor 314 and from there into the various parts of the amplifier circuit. The current from the amplifier circuit will double back to the source through the various grounded parts of the amplifier circuit to the grounded lead 68, the lead 66, the closed master switch 67 and the lead 61.

Pivotal movement of the arm 55, upon energization of the coil 53 of the master relay 52, causes the arm to move away from the contact 57 breaking the circuit through the sign motor 102 and the sign 26. However, the auxiliary circuit previously referred to now goes into operation to cause the sign 26 to be continuously illuminated, without flickering, during the time that the amplifier circuit is in operation. That auxiliary circuit can be traced along the lead 62, onto the lead 69, the lead 97, the lead 109, the arm 55, the contact 59 into the lead 313. To the lead 313 there is connected one end of a lead 338 which is connected to the lead 118. Thus, the current passes from the lead 313, along the lead 338, the lead 118, the lead 113, the light bulbs 99, the lead 112, the lead 117, the lead 111, the lead 66, through the closed master switch 67 and the lead 61 back to the source.

There is the probability that when the arm 55 moves away from the contact 57, the sign motor 102 will be stopped in a position in which the contacts 106 and 107 of the flicker switch 105 are in a closed position. With those contacts closed current passing through the lead 338 will divide at its point of connection with the lead 118 passing through the closed contacts 106 and 107 along the lead 119 and the lead 110 to the sign motor energizing the same to rotate the cam 103 with the arm 55 engaging the contact 59. However, that energization of the sign motor 102 will only continue until the high point 104 on the cam 103 opens the flicker switch 105 breaking the circuit through the motor 102 deenergizing the same leaving the auxiliary circuit to continuously illuminate the sign 26 as long as the master relay 52 is energized.

Energization of the master relay 52 to close the arm 55 against the contact 59 will also cause the turntable 35 upon which the disc record 37 is rested to be rotated by a turntable motor 339, see Fig. 16. One side of the turntable motor 339 is connected by a lead 340 to the lead 313. The other side of the turntable motor 339 is grounded through a lead 341. With the master relay 52 energized the circuit for the turntable motor 339 can be traced along the lead 62, the lead 69, the lead 97, the lead 109, the arm 55, the contact 59, the lead 313, the lead 340, through the turntable motor 339, through the grounded lead 341, to the grounded lead 68, the lead 66, the closed master switch 67 and the lead 61 back to the source.

With energization of the turntable motor 339, the turntable 35 will be rotated and the usual mechanism, not shown, of the automatic record player 33 will cause the transcribing arm 36 to be lifted placing the needle 38 in the start of the sound track or groove cut in the face of the record. As the turntable 35 with the needle 38 engages the record, the first message of the record will be picked up by the needle 38 and fed through the amplifier circuit to the primary 290 of the sound output transformer 226. That output transformer 226 includes a secondary winding 342 which has one side connected by a lead 343 which in turn is connected to the spring finger 202 of the selector switch 143. The other side of that secondary winding 342 is connected by a lead 344 to the contact 311 of the signal relay 231 which is engaged by the grounded arm 309 in the deenergized position of that relay 231.

The finger 202, to which the lead 343 is connected, is in continual engagement with the arm 195 in all of the turned positions of that arm. When a cycle of the sound apparatus is started by energization of the master relay 52, that arm 195 is always in contact with the first contact 193 of the set carried by the insulation plate 188 regardless of whether the changeover switch 120 is in its number "1" or its number "2" position, as shown in Figs. 10 and 18. That first contact engaged by the arm 195 is connected by a lead 345 to one side of the main speaker 46 positioned within the control box 25 behind the grille 45. The other side of the main speaker 46 is grounded through a lead 346. The movement of the sound signal from the secondary 342 of the output transformer 226 through the main speaker 46 can be traced along the lead 343, through the spring finger 202, the arm 195, the contact 193 engaged by the arm 195, along the lead 345, through the speaker 46, through the grounded lead 346, to the grounded lead 310 (Fig. 17), through the arm 309, the contact 311 and the lead 344 back to the secondary 342. The output circuit of the transformer 226 is grounded through the arm 209 of the signal relay 231, so that when the signal relay is energized by a signal on the disc record 37 the arm 309 will move away from the contact 311 momentarily breaking the output circuit so that the signal will not be played through the speakers.

Figure 2:
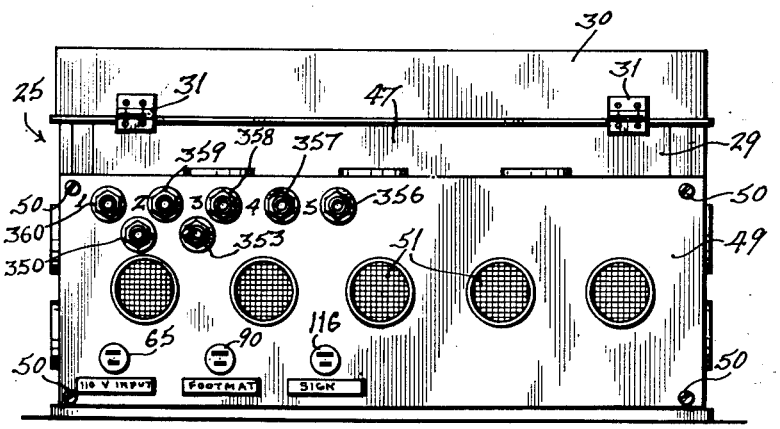
Fig. 2 is a rear elevational view of the control box of the sound reproducing apparatus.

Provided for concurrent use with or for use in place of the main speaker 46, there is an auxiliary main speaker 347, shown diagrammatically only in Fig. 18. That auxiliary main speaker 347 is a unit separate from the control box 25 for use away from that box and is connected by a pair of leads 348 to a switchboard-type plug 349. The plug 349 is arranged to be inserted into a switchboard-type jack 350 mounted through the rear wall of the metallic container 49, see Fig. 2. One side of the jack 350 is connected by a lead 351 to the lead 345 and the other side of the jack is grounded through a lead 352. Connected in series in the lead 345, between the point of connection of the lead 351 and the main speaker 46, there is a switch 353 of the toggle type which is normally left closed, as shown in Fig. 18. The switch 353 is also mounted through the rear wall of the metallic container 49, as shown in Fig. 2, where it can be conveniently reached to be opened and closed.

With the arm 195 engaging the first contact 193 completing the output circuit of the transformer 226 through the lead 345, and with the plug 349 plugged into the jack 350, both the main speaker 46 and the auxiliary main speaker 347 will play the first message of the disc record. However, if the switch 353 is opened, only the auxiliary main speaker 347 will play the first message. Thus, it is apparent that with the plug 349 inserted into the jack 350, the auxiliary main speaker 347 will be in continuous operation with only the operation of the main speaker 46 being effected by the position of the switch 353.

The connections from the arm 195 so that the second, third, fourth, fifth and sixth messages will be successively played through the auxiliary speakers 28 as the arm 195 is caused to step from contact 193 to contact 193 by energization of the change relay 204, are shown in Fig. 18. Each of the auxiliary speakers 28 is connected by leads 354 to switchboard-type plugs 355. Each plug 355 is to be inserted into a correct one of five different switchboard-type jacks 356, 357, 358, 359 and 360 mounted through the rear wall of the metallic container 49 as shown in Figs. 2 and 3. One side of the first jack 356 is connected by a lead 361 to the second contact of the group of contacts 193 and has its other side grounded through a lead 362. The second jack 357 has one side connected to the third contact of the group of contacts 193 by a lead 363 and its other side grounded through a lead 364. The third jack 358 has one side connected to the fourth contact of the group of contacts 193 by a lead 365 and its other side grounded through a lead 366. The fourth jack 359 has one side connected to the fifth contact of the group of contacts 193 by a lead 367 and its other side grounded through a lead 368. The fifth jack 360 has one side connected to the sixth contact of the group of contacts 193 by a lead 369 and has its other side grounded through a lead 370. Thus, when the arm 195 is caused to step from the first contact into engagement with the second contact of the group of contacts 193, the sound signal from the secondary 342 of the output transformer 226 (Fig. 17) will be fed to the arm 195 along the same path outlined in connection with the main speaker 46. However, from the arm 195, that sound signal will be passed through the second contact 193 to the lead 361, through the first auxiliary speaker 28, through the grounded lead 362, then to the grounded lead 310, through the arm 309 and back to the secondary 342 as described in connection with the main speaker, so that the second message of the record is placed through the first auxiliary speaker 28. Similarly, the path of the third, fourth, etc. messages of the record can be traced through the second, third, etc. auxilary speakers 28.

The number of speakers that will be in operation during any one cycle of operation of the reproducing apparatus, with the changeover switch 120 in its number "1" position, will be directly controlled by the setting of the selector switch 143.

Returning again to the energization of the master relay 52 upon energization of the control relay 74 by stepping on the foot pad 27 or pressing of the auxiliary switch 95, a circuit is provided whereby the master relay will retain itself energized even if the person should step off the foot pad 27 or release the auxiliary switch 95. That circuit will act to maintain the master relay 52 energized until the circuit is broken by operation of means to be hereinafter described controlled by the signal relay 231.

The circuit for maintaining the relay 52 energized includes the arm 54 of that relay regardless of whether the changeover switch is in its number "1" or its number "2" position. When the relay 52 is deenergized, as shown in Fig. 16, that arm 54 is inoperatively engaged with the blank contact 56. However, the moment energization of the master relay 52 is effected, the arm 54 moves over and contacts the contact 58 of the master relay 53. That contact 58 is connected by a lead 371 to the lead 97 between its points of connection with the contact 76 and the lead 96. A lead 372 (Figs. 16, 17 and 18) is connected at one end to the arm 54 of the master relay 52 to the contact strip 141 of the changeover switch 120. In the number "1" position of that changeover switch 120, that contact strip 141 is engaged by the projection 140 of the half ring 137 and which in turn is engaged by the contact strip 135. From the contact strip 135 there extends a lead 373 (Figs. 16, 17 and 18). The other end of the lead 373 is connected to one side of a normally closed shut-off switch 374, see Fig. 16. A lead 375 connected to the other side of the switch 374 is connected to the lead 96 between the arm 75 and the coil 53 of the master relay 52.

Thus, with the changeover switch in its number "1" position, the circuit for maintaining the master relay energized after the control relay 74 is deenergized, can be traced from the source through the lead 62, the lead 69, the lead 97, the lead 371 to the contact 58, through the arm 54, the lead 372 to the contact strip 141 and out on the contact strip 135, to the lead 373, through the closed shut-off switch 374 along the lead 375 to the lead 96. With the control relay 74 deenergized the arm 75 will be moved away from the contact 76 so that the current in the lead 96 will be fed into one side of the coil 53 of the master relay 52 and out of the other side to the lead 66, through the closed master switch 67 and the lead 61 back to the source. In that number "1" position of the changeover switch 120 that circuit through the coil 53 of the master relay 52 will be maintained until the switch 374 is momentarily opened breaking the circuit deenergizing the coil 53 and freeing the arms 54 and 54 to move back to engage the contacts 56 and 57, respectively.

For opening the shut-off switch 374, it is connected to the reject arm 39 of the automatic record player 33, as diagrammatically illustrated by the insulation piece 376 in Fig. 16. The reject arm 39 is connected to the core of a reject solenoid 377 having a coil 378 so that when the coil 378 is energized, as will be hereinafter described, the reject arm 39 of the record player 33 will be pulled over and in turn momentarily open the switch 374 breaking the circuit through the coil 53.

In the number "2" position of the changeover switch 120, the path of the circuit for retaining the master relay 52 energized after the control relay 74 is deenergized, is through a shut-off relay 379, see Fig. 18, having a coil 380 and an arm 381 closed against a contact 382 when the coil 380 is deenergized. It is appreciated, of course, that when the changeover switch is turned to its number "2" position, the projection 140 of the half ring 137 moves out of engagement with the contact strip 141 and into engagement with the contact strip 142. The contact strip 135 engages the half ring 137 in each of the positions of the half ring 137.

To complete the number "2" position circuit, the arm 381 of the shut-off relay 379 is connected by a lead 383 to the lead 372. The contact 382 of the shut-off relay 379 is connected by a lead 384 to the contact strip 142 of the changeover switch 120. In the number "2" position of the changeover switch the circuit will be traced from the source through the lead 62, the lead 69, the lead 97, the lead 371 to the contact 58, through the arm 54 into the lead 372. The current cannot continue along the lead 372 because the projection 140 is out of contact with the contact strip 141 so the current passes from the lead 372 into the lead 383, through the arm 381 of the shut-off relay 379, into the contact 382, along the lead 384 to the contact strip 142, out of the contact strip 135, along the lead 372, through the closed shut-off switch 374, along the lead 375, to the coil 53, along the lead 66, through the closed master switch 67 and the lead 61 back to the source 61. In the number "2," that circuit through the master relay 52 will be maintained as long as the arm 381 maintains its engagement with the contact 382. However, when the coil 380 of the shut-off relay 279 is energized, as will be hereinafter explained, the arm 381 will be pivoted away from the contact 382 breaking the circuit through the master relay 52 causing the same to be deenergized.

It is appreciated that, in the number "1" position of the changeover switch 120, the current for maintaining the master relay 52 energized cannot pass through the arm 381 of the shut-off relay 379 because the projection 140 is out of contact with the contact strip 142, as shown in Fig. 18.

Turning now to the signal relay 231, there is extended from its contact 312, which is engaged by arm 309 when the coil of signal relay is energized, a lead 385 (Figs. 17 and 18) which is connected at its other end to the contact strip 129 of the changeover switch 120 which is in contact with the contact ring 130 in each of the two positions of that changeover switch. Extending from the contact strip 133 of the changeover switch 120, there is a lead 386 which is connected at its other end to the one side of the coil 380 of the shut-off relay 379. Extending from the contact strip 132 of the changeover switch 120, there is a lead 387 which is connected at its other end to a coil 388 of a supply relay 389. The supply relay 389 is a normally open relay having an arm 390 which moves over into electrical engagement with a contact 391 when the coil 388 of the supply relay 389 is energized.

The contact strip 134 of the changeover switch 120 is connected by a lead 392 (Figs. 16, 17 and 18) to one side of the coil 378 of the reject solenoid 377. Extended from the other side of that coil 378 there is a lead 393 which is connected at its other end to the lead 313 between the contact 59 and the resistor 314. The lead 393 includes in series a resistor 394 and a selenium rectifier 395 to feed D. C. current from the A. C. source to the coil 378. Connected to the lead 393, between the coil 378 and the rectifier 395, there is a grounded lead 396 which includes in series a condenser 397.

Extending from the contact 334 of the plate relay 331, which contact is engaged by the arm 333 of that relay when its coil 330 is energized, there is a lead 398 (Figs. 17 and 18) which continues into branch leads 398ª and 398ᵇ. The branch lead 398ª is connected to one side of the coil 221 of the release relay 218. The other lead 398ᵇ is connected at its free end to one side of the coil 399 of a normally open auxiliary relay 400. The relay 400 further includes an arm 401 arranged to be moved into electrical contact with a contact 402 which is grounded through a lead 403. The arm 401 of the auxiliary relay 399 is connected by a lead 404 to the contact strip 139 of the changeover switch 120.

The arm 390 of the supply relay 389 is grounded through a lead 405. The contact 391 of that relay 389, which is engaged by the arm 390 when the relay is energized, is connected by a lead 406 to one side of the change relay 204. Extending from the lead 313, see Fig. 17, there is a lead 407 (Figs. 17 and 18). One branch lead 407ª from the lead 407 is connected to the coil 399 of the auxiliary relay 400. Another branch lead 407ᵇ from the lead 407 is connected to the coil 380 of the shut-off relay 379. Still another branch lead 407ᶜ from the lead 407 is connected to the coil 388 of the supply relay 389. A branch lead 407ᵈ from the lead 407 is connected to the coil 205 of the change relay 204. Finally, a branch 407ᵉ from the lead 407 is connected to the coil 221 of the release relay 218.

Extending from the lead 332, between its point of connection with the coil 330 of the plate relay 331 and the plate 244 of the tube 243, there is a lead 408, see Fig. 17. The other end of the lead 408 is connected to one end of a resistor 409. Connected to the other end of the resistor 409 there is a lead 410 (Figs. 17 and 18) which is connected at its other end to the projection 163ª of the metallic contact ring 163 of the manually operative part of the selector switch 143. A lead 411 connects the first of the contact strips 164 of the manually operative part of the selector switch 143 to the first contact of the group of contacts 192 of the electrically operated part of the selector switch. That first contact 192 is the one engaged by the arm 194 in the starting position of the selector switch 143, as shown in Figs. 9 and 18. A lead 412 connects the second contact strip 165 with the second contact 192. A lead 413 connects the third contact strip 166 with the third contact 192. A lead 414 connects the fourth contact strip 167 with the fourth contact 192. The fifth contact strip 168 is connected to the fifth contact 192 by a lead 415. The sixth contact strip 169 is connected to the sixth contact 192 by a lead 416. The spring finger 201 which is in continual electrical contact with the arm 194 is grounded through a lead 416.

Operation of the sound producing apparatus:

In considering the operation of the apparatus, it is thought that the following phases of the operation will be clear from the foregoing description without a further detailed operation at this time:

1. Energization of the 6 volt step-down transformer 71 when the master switch 67 is closed.
2. Action of the foot pad 27 and the auxiliary switch 95 in energizing the coil 73 of the control relay 74 when the master switch 67 is closed.
3. Initial energization of the master relay 52 when the control relay 74 has been energized.
4. Action of the arm 54 of the master relay 53 in maintaining the master relay energized after the control relay 74 has been deenergized.
5. Illumination of the sign 26 both when the master relay 52 is deenergized and energized.
6. Energization of the turntable motor 339 when the master relay is energized.
7. Energization of the heaters of the various tubes of amplifier circuit through the filament transformer 248 when the master switch 67 is closed.
8. Playing of the sound signal from the output transformer 226 through the various speakers when the arm 195 is stepped with relation to the contacts 193.

Accordingly, all that there remains to describe is the action of the apparatus in the various positions of the changeover switch 120 and the selector switch 143 when a signal from the record causes signal relay 231 to be excited.

First, let us assume that the changeover switch 120 is in its number "1" position and that the selector switch 143 is in its "off" position shown in Figs. 3 and 18. In that position of the switches 120 and 143, the first message of the record 37 will be played through the main speaker 46 and/or the main auxiliary speaker 347, depending upon the position of the switch 353 and whether or not the plug 349 is inserted into the jack 350, all as previously described. When the signal from the record causes the coil 230 of the signal relay 231 to be energized, the arm 309 will immediately be attracted by the coil 230 away from the contact 311 and into electrical contact with the contact 312. This action of the arm 309 away from the contact 311 will momentarily break the output circuit from the output transformer 226 to the speakers so that the signal sound will not be played by the speakers, again as previously described. With the arm 309 contact with the contact 312, a circuit through the coil 388 of the supply relay 389 is completed causing that relay to be energized. The circuit can be traced from the source through the lead 61, the closed master switch 67, the lead 67 to the grounded lead 68, then to the grounded lead 310, through the arm 309, the contact 312, to the lead 385 to the contact strip 129, out of the contact strip 132, through the lead 387 to the coil of the supply relay 389, along the lead 407ᶜ, the lead 407, to the lead 313, to the contact 59 of the master relay 53, the arm 55, the lead 109, the lead 97, the lead 69 and the lead 62 back to the source. Immediately upon energization of the coil 388 of the supply relay 389, the arm 390 will move over into contact with the contact 391 completing a circuit to the coil 205 of change relay 204.

The circuit to the coil 205 can be traced from the source along the lead 61, the lead 66, through the closed master switch 67, through the grounded lead 68, to the grounded lead 405, through the arm 390, the contact 391, the lead 406, the coil 205, the lead 407ᵈ, the lead 407, the lead 313, to the contact 59 of the master relay 52, through the arm 55, the lead 109, the lead 97, the lead 69 and the lead 62 back to the source. Energization of the coil 205 of the change relay 204 will cause the ratchet wheel 182 to be advanced one tooth in a direction in which the pin 185 moves away from the stop member 186. Similar movement will be imparted to the arms 194 and 195 advancing them to the next contact 192 and 193 respectively.

However, before advance of the arm 194 is completed, a circuit will be completed from the source along the lead 61, the lead 66 through the closed master switch 67, the grounded lead 68 to the grounded lead 416 to the spring finger 201, through the arm 194 to the first contact 192, the lead 411, the contact strip 164, the projection 173, the half-ring 172, the contact ring 170, through the projections 171, into the contact ring 163 through its projection 163ᵃ along the lead 410, through the resistor 409, along the lead 408, the lead 332, through the coil 330 of the plate relay 331, along the lead 329, the lead 319, through the resistor 318, the lead 317, the rectifier 316, the lead 315, the resistor 314, the lead 313, to the contact 59 of the master relay 52, the arm 55, the lead 109, the lead 97, the lead 69 and through the lead 62 back to the source. Immediately, the coil of the plate relay 331 will be energized drawing its arm 333 into electrical contact with the contact 334.

Movement of the arm 333 will immediately complete circuits to energize the auxiliary relay 400 and in turn the reject solenoid 377 and to energize the release relay 218. The circuit for energizing the auxiliary relay 400 can be traced from the source through the lead 61, the lead 66, the closed master switch 67 and through the grounded lead 68 to the grounded lead 335, the lead 337, through the arm 333 of the plate relay 331, the contact 334, the lead 398, the lead 398ᵇ, through the coil 399 of the auxiliary relay 400, the lead 407ᵃ, the lead 407, the lead 313, the contact 59, the arm 55 of the master relay 53, the lead 109, the lead 97, the lead 69 and through the lead 69 back to the source. Energization of the auxiliary relay 400 will cause its arm 401 to move over and engage the contact 402 energizing the reject solenoid 377. The circuit through the reject soleinoid 377 can be traced from the source through the lead 61, the lead 66 through the closed master switch 67, through the grounded lead 68 to the grounded lead 403, to the contact 402, through the arm 401, through the lead 404, to the contact strip 139, out of the contact strip 134, to the lead 392, into the coil 378 of the reject solenoid 377, along the lead 393, through the rectifier 395 and the resistor 394 to the lead 313, the contact 59, the arm 55, the lead 109, the lead 97, the lead 69 through the lead 62 back to the source. Energization of the solenoid 377 will pull on the reject arm 39 of the automatic record player causing the shutoff switch 374 to be opened breaking the circuit through the arm 54 of the master relay 52 causing the master relay 52 to be de-energized shutting off the current to the amplifier circuit and the turntable motor 339 with the movement of the reject arm functioning simultaneously to return the transcribing arm 36 back to its starting position on the record.

However, the auxiliary relay 400 delayed energization of the reject solenoid 377 just long enough for the plate relay 331 to energize the release relay 218. The circuit for the release relay 218 can be traced from the source through the lead 61, to the lead 66, through the closed master switch 67 to the grounded lead 68, to the grounded lead 335, the lead 337, the arm 333 of the plate relay 330, the contact 334, the lead 398, the branch lead 398ᵃ into the coil 221 of the release relay 218, through the lead 407ᵉ, the lead 407, the lead 313, the contact 59 of the master relay (of course, before the reject solenoid 377 has had an opportunity to break the circuit through the master relay 52), the arm 55, the lead 109, the lead 97, the lead 69 through the lead 62 back to the source. Energization of the coil 221 of the release relay 218 to pivot the pawl 215 out of engagement with the teeth 182ᵃ of the ratchet wheel 182. The effect is to free the ratchet wheel 182 to be returned to its starting position with the pin 185 against the stop member 186, so that when the selector switch 143 is in the "off" position there is actually no advance of the ratchet wheel 182 and no advance of the arms 194 and 195.

Assume now that the changeover switch 120 remains in its number "1" position and that the manually operative portion of the selector switch 143 is moved to its number "1" position, see Fig. 3. Turning of the knob 152 of the selector switch 143 to the number "1" position will cause the projection 173 of the half ring 172 to move into contact with the contact strip 165 and out of contact with the contact strip 164. As described for the selector switch 143 when in its "off" position, the first message of the record will be played through the main speaker 46 and/or the auxiliary main speaker 347. When the first signal on the record 37 excites the signal relay 231 it will only cause the supply 389 and the change relay 204 to be energized, as previously described. This will cause the ratchet wheel 182 to be advanced one tooth and to be held in that position by the pawl 215. Simultaneously, the arms 194 and 195 are moved into contact with the second contacts 192 and 193, respectively. Movement of the arm 195 will cause the second message of the record to be played through the first auxiliary speaker 28 by way of the lead 361. Movement of the arm 194 to the second contact 192 will complete the plate relay circuit, previously described, from the arm 194, the lead 412 to the contact strip 165 engaged by the projection 173 in the number "1" position of the selector switch. So when the second signal at the end of the second message of the record causes the signal relay 231 to be energized, the plate relay 330 will be energized to in turn energize the auxiliary relay 400 energizing the reject solenoid 377 to open the shut-off switch 374 deenergizing the master relay 52 and to energize the release relay 218 to move the pawl 215 clear of the ratchet wheel 182 to be moved back to its starting position by the spring 184 causing the arms 194 and 195 to be moved back to their starting positions, all as previously described.

The action of the parts is similar for each of the other settings of the selector switch 143 with the exception that more messages will be played in succession through the auxiliary speakers 28 before the circuit through the master relay 52 is broken by opening of the shut-off switch 374.

Finally, let us consider the operation of the apparatus when the changeover switch 120 is turned to its number "2" position. When the switch 120 is changed to that number "2" position, the projection 131 of the contact ring 130 moves out of electrical engagement with the contact strip 132 and into electrical engagement with the contact strip 133. This places the coil 380 of the shut-off relay in series with the arm 309 of the signal relay 231. At the same time, the projection 140 of the half ring 137 moves out of contact with the contact strip 141 and into electrical engagement with the contact strip 142, placing the arm 381 of the shut-off relay 379 in series in the circuit which retains the master relay 52 energized. Concurrently, the projection 138 of the half ring 136 moves out of electrical contact with the contact strip 139 to an inoperative position disconnecting the reject solenoid 377 from its electrical circuit so that the reject solenoid will be inoperative. Also, in the number "2" position of the changeover switch 120, the selector switch 143 is not used, but its arms 194 and 195 are in electrical engagement with the first contacts of their respective groups of contacts 192 and 193.

Upon initial energization of the master relay 52 by energization of the control relay 74, the apparatus will be set in operation to play the first message of the disc record 37 through the main speaker 46 and/or the auxiliary main speaker 347, as previously described. When the needle 38 of the transscribing arm 36 picks up the first signal at the end of the first message, the coil 230 of the signal relay 231 will be energized causing the arm 309 to be pulled over into electrical engagement with the contact 312 to complete a circuit to energize the coil 380 of the shut-off relay 379. The circuit to the coil 380 can be traced from the source along the lead 61, the lead 66, the closed master switch 67, through the grounded lead 68 to the grounded lead 310, through the arm 309 to the contact 312, to the lead 385, to the contact strip 129 of the changeover switch 120, out of the contact strip 133, to the lead 386, to the coil 380, the lead 407b, the lead 407, the lead 313, the contact 59 of the master relay 52, the arm 55, the lead 109, the lead 97, the lead 69, into the lead 62 back to the source. When the coil 380 of the shut-off relay 379 is energized it will function to pull over the arm 381 moving it off the contact 382 breaking the circuit which holds the master relay 52 energized, shutting off the amplifier circuit and the circuit to the turntable motor 339. However, the transcribing arm 36 will be left in position on the disc record 37 with its needle 38 at the start of the second message on the record.

Upon a second energization of the master relay 52 by first energizing the control relay 74, the apparatus will again be set in operation to play the second message of the disc record through the main speaker 46 and/or the auxiliary main speaker 347. When the signal of the record at the end of the second message is picked up by the needle 38, the coil 230 of the sign relay 231 will again be energized to cause energization of the coil 380 of the shut-off relay 379 to again shut off the machine. But this time, the needle 38 of the transcribing arm 36 will be left at the start of the third message of the disc record. Each time the master relay 52 is energized, the process is repeated causing the messages of the disc record 37 to be played one after another only through the main speaker 46 and/or the auxiliary main speaker 347 with the apparatus being shut off at the end of each message. When the needle 38 reaches the inner end of the record groove on the face of the disc record 37, the usual apparatus, not shown, of the automatic record player 33 will function to return the transcribing arm 36 to the starting position on the disc record.

Thus, it is apparent that with the changeover switch 120 in the number "2" position only one message of the disc record 37 will be played for each energization of the master relay 52 by the control relay 74. Those messages may be all different or all the same as the use of the apparatus may dictate. If the messages are all the same, the life of the record will be materially increased by reducing the number of times each message will be played as compared with continuous replaying of a single message recorded on a record.

From the foregoing it is apparent that the present invention provides a sound reproducing apparatus which is entirely automatic in its operation and one which may have applications in business and industry and in the field of audiovisual education which are too numerous to mention but which will be fully understood by those skilled in the fields.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A sign control circuit for a sound reproducing apparatus, comprising a normally open control relay, a master relay, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay including a normally closed contact arm in the deenergized position of said master relay, an electric sign connected in series with said normally closed contact arm and the source for illuminating said sign in the deenergized position of said master relay, a normally closed switch connected in series in said sign circuit, a sign motor connected in parallel in said sign circuit to be energized through said normally closed contact arm, and a cam mounted on the driven shaft of said sign motor and engaging said normally closed switch to momentarily open the sign circuit turning off the sign for each rotation of said cam.

2. A sign control circuit for a sound reproducing apparatus, comprising a normally open control relay, a master relay, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay including a normally closed contact arm in the deenergized position of said master relay, an electric sign connected in series with said normally closed contact arm and the source for illuminating said sign in the deenergized position of said master relay, a normally closed switch connected in series in said sign circuit, a sign motor connected in parallel in said sign circuit to be energized through said normally closed contact arm, a cam mounted on the driven shaft of said sign motor and engaging said normally closed switch to momentarily open the sign circuit turning off the sign for each rotation of said sign cam, and an auxiliary circuit through said sign shunting said normally closed switch and said sign motor and controlled by energization of said master relay to have said sign continuously illuminated when said master relay is energized.

3. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, and a plurality of grounded auxiliary speakers connected each to one of the other contacts of said stepping switch to be successively played through as said arm is rotated.

4. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, a second grounded main speaker connected in parallel with said first main speaker, and a normally closed manually operable switch connected in series with said first-mentioned main speaker to be opened so that said second main speaker can be used independently of said first-mentioned main speaker.

5. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, and means including a normally operable selector switch for controlling the number of messages from the disc record that will be played through said main speaker and said auxiliary speakers.

6. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, and means including a normally operable selector switch for controlling the number of messages from the disc record that will be played through said main speaker and said auxiliary speakers, said control means including a second stepping switch moving in unison with said first stepping switch and means including a change relay arranged to be energized by said signal relay through a supply relay for advancing said stepping switches.

7. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, means including a normally operable selector switch for controlling the number of messages from the disc record that will be played through said main speaker and said auxiliary speakers, said control means including a second stepping switch moving in unison with said first stepping switch, and means including a change relay arranged to be energized by said signal relay through a supply relay for advancing said stepping switches, said stepping switches being resiliently urged into a starting position, a release relay energized by said control means for freeing said stepping switches to be returned to their starting positions by said resilient means.

8. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, means including a normally operable selector switch for controlling the number of messages from the disc record that will be played through said main speaker and said auxiliary speakers, said control means including a second stepping switch moving in unison with said first stepping switch, means including a change relay arranged to be energized by said signal relay through a supply relay for advancing said stepping switches, a normally closed switch connected in series with the circuit which supplies current to said master relay even after said control relay opens, a reject arm for the transcribing arm, said reject arm being connected to said normally closed switch to open the same and break the circuit through said master relay, and a reject solenoid connected to said reject arm and connected in the circuit with said control means to be energized to operate said reject arm to move said transcribing arm back to its starting position and open said normally closed switch.

9. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary, connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, means including a normally operable selector switch for controlling the number of messages from the disc record that will be played through said main speaker and said auxiliary speakers, said control means including a second stepping switch moving in unison with said first stepping switch means including a change relay arranged to be energized by said signal relay through a supply relay for advancing said stepping switches, a normally closed switch connected in series with the circuit which supplies current to said master relay even after said control relay opens, a reject arm for the transcribing arm, said reject arm being connected to said normally closed switch to open the same and break the circuit through said master relay, a reject solenoid connected to said reject arm and connected in the circuit with said control means to be energized to operate said reject arm to move said transcribing arm back to its starting position and open said normally closed switch, and a normally closed shut-off relay for breaking the circuit through said master relay independently of said reject solenoid.

10. Control mechanism for a sound reproducing apparatus arranged to transcribe messages from a disc record or the like which are separated from each other by a signal recorded at a frequency above the frequency of the messages and having a source of electrical energy, comprising a normally open control relay, a master relay, an amplifier circuit influenced by a transcribing arm having a needle for engaging the disc record and connected to said master relay to be energized when said master relay is energized, a control transformer having its primary connected in series with the source and a manually operable master switch for causing the primary to be energized when said master switch is closed, said transformer having its secondary connected in series with switch means and said control relay for causing said control relay to be closed when said switch means is closed, said control relay being connected to said master relay to energize said master relay when said control relay is closed, said master relay being connected in said circuit with the source so as to remain energized even after said control relay has again opened, said amplifier circuit being divided into a sound branch connected to the primary of an output transformer and a signal branch connected to the coil of a signal relay to energize the signal relay when a signal of a disc record is picked up by the transcribing needle, said signal relay having a grounded arm closed against one contact when its coil is deenergized and closed against a second contact when its coil is energized, said output transformer having one of the sides its secondary connected to the said one contact, a stepping switch having a rotative arm and a plurality of contacts to be successively engaged by said arm as it is rotated, said secondary of said output transformer having its other side connected to said arm, a grounded main speaker connected to one of said contacts of said stepping switch, a plurality of grounded auxiliary speakers connected each to one of the other contacts of said stepping switch to be successively played through as said arm is rotated, means including a normally operable selector switch for controlling the number of messages from the disc record that will be played through said main speaker and said auxiliary speakers, said control means including a second stepping switch moving in unison with said first stepping switch, means including a change relay arranged to be energized by said signal relay through a supply relay for advancing said stepping switches, a normally closed switch connected in series with the circuit which supplies current to said master relay even after said control relay opens, a reject arm for the transcribing arm, said reject arm being connected to said normally closed switch to open the same and break the circuit through said master relay, a reject solenoid connected to said reject arm and connected in the circuit with said control means to be energized to operate said reject arm to move said transcribing arm back to its starting position and open said normally closed switch, a normally closed shut-off relay for breaking the circuit through said master relay independently of said reject solenoid, and a manually operable two position changeover switch for controlling deenergization of said master relay through said reject solenoid or through said shut-off relay.

MELVIN A. CARTER.

REFERENCES CITED

The following references are of record in the file of this patent:

UNITED STATES PATENTS

| Number | Name | Date |
|---|---|---|
| 1,775,755 | Forman | Sept. 16, 1930 |
| 1,776,992 | Brockman | Sept. 30, 1930 |
| 1,842,895 | Chadwick | Jan. 26, 1932 |
| 2,027,426 | Hammond et al. | Jan. 14, 1936 |
| 2,031,074 | Scheibell | Feb. 18, 1936 |
| 2,068,106 | Horn et al. | Jan. 19, 1937 |
| 2,076,937 | Cannon | Apr. 13, 1937 |
| 2,116,314 | Jenkins et al. | May 3, 1938 |
| 2,463,050 | Pasternack | Mar. 1, 1949 |